United States Patent [19]

Dudle et al.

[11] Patent Number: 5,570,291

[45] Date of Patent: Oct. 29, 1996

[54] CUSTOM PRODUCT ESTIMATING AND ORDER PROCESSING SYSTEM

[75] Inventors: James Dudle, Homewood; Michael Leatherman, Tinley Park; Michael Morrison, Highland Park; Waldo Schnell, Prospect Heights, all of Ill.

[73] Assignee: Wallace Computer Services, Inc., Hillside, Ill.

[21] Appl. No.: 298,274

[22] Filed: Aug. 31, 1994

Related U.S. Application Data

[63] Continuation-in-part of Ser. No. 295,385, Aug. 24, 1994, abandoned.

[51] Int. Cl.[6] ............................................. G06F 19/00
[52] U.S. Cl. ........................... 364/468.01; 364/401 R
[58] Field of Search ..................................... 364/188, 146, 364/474.22, 468, 401–403

[56] References Cited

U.S. PATENT DOCUMENTS

| | | | |
|---|---|---|---|
| 4,007,362 | 2/1977 | Sindermann | 235/151 |
| 4,471,348 | 9/1984 | London et al. | 340/722 |
| 4,598,376 | 7/1986 | Burton et al. | 364/192 |
| 4,826,333 | 5/1989 | Tanaka | 340/750 |
| 4,839,829 | 6/1989 | Freedman | 364/519 |
| 4,862,376 | 8/1989 | Ferriter et al. | 364/468 |
| 4,887,206 | 12/1989 | Natarajan | 364/401 |
| 4,953,159 | 8/1990 | Hayden et al. | 370/62 |
| 4,964,043 | 10/1990 | Galvin | 364/401 |
| 5,109,337 | 4/1992 | Ferriter et al. | 364/401 |
| 5,117,354 | 5/1992 | Long et al. | 364/401 |
| 5,189,606 | 2/1993 | Burns e tal. | 364/401 |
| 5,222,211 | 6/1993 | Mueller et al. | 395/161 |
| 5,241,464 | 8/1993 | Greulick et al. | 364/401 |
| 5,249,120 | 9/1993 | Foley | 364/401 |
| 5,255,207 | 10/1993 | Cornwell | 364/512 |
| 5,299,305 | 3/1994 | Oomae et al. | 395/149 |
| 5,311,438 | 5/1994 | Sellers et al. | 364/468 |
| 5,317,646 | 5/1994 | Sang, Jr. et al. | 382/9 |
| 5,357,439 | 10/1994 | Matsuzaki et al. | 364/468 |

FOREIGN PATENT DOCUMENTS 10141858  5/1985  European Pat. Off. ........ G05B 23/02

Primary Examiner—Roy N. Envall, Jr.
Assistant Examiner—Thomas E. Brown
Attorney, Agent, or Firm—Roylance, Abrams, Berdo & Goodman, L.L.P.

[57] ABSTRACT

A system and method for generating estimates and orders for the manufacture of custom items such as business forms is provided which stores estimate data at a central location, e.g., a corporate office, for access by sales representatives at remote sales sites. A sales representative creates an item specification for a form to be manufactured and electronically transmits it to the corporate office for estimate data. Data relating to the cost and list price to produce the form based on the item specification is transmitted to the sales representative. The sales representative determines a sell price from the pricing data, and generates a production order using the item specification and the estimate data, among other data. The production order is transmitted to a manufacturing plant for job execution. The system manages a centralized repository of item specification, estimate and customer contract data, among other types of data, for analysis and reporting which can be accessed by computers at different manufacturing plants and sales sites.

5 Claims, 27 Drawing Sheets

Estimate Worksheet

Form Number: ☐  Revision: ☐
Form Description: ☐
Form Type: ☐

Stub Size: ☐ ⬇ Width: ☐ ⬇ No. Plys: ☐  No. Carbons: ☐

| Modify | ☐ Construction | Modify | ☐ Pocket Forms |
| Modify | ☐ Form Composition | Modify | ☐ Numbering |
| Modify | ☐ Fastenings | Modify | ☐ Packing & Packaging |
| Modify | ☐ Punching | Modify | ☐ OCR and OMR |
| Modify | ☐ Perforations | Modify | ☐ Wal-Labels |
| Modify | ☐ Inks | Modify | ☐ Miscellaneous |

General | ✓ OK | Cancel | Usage

```
EP601CC                                      PAGE ***
*******                                      *******
         MATRIX PRICING - CONTRACT SET-UP
ACTION       (I=INQUIRE CURRENT, A=ADD, C=CHANGE, D=DELETE, L=LIST) ──252
KEY
  CONTRACT SCHEDULE  ......      PRICING FACTOR     ........
  PROD TYPE          ..          EFFICIENCY FACTOR  ........
ARGUMENT
  CUSTOMER NAME           ......
  STANDARD CONTRACT SCHEDULE  ......
  NEW/REPEAT              .     (N OR R)

NEXT TRANSACTION  .....

*****************************************************************
PF1=TABLE MENU  PF4=NEXT SCREEN  PF7=PRINT SCHEDULE  PF8=SAVE SCHEDULE ──254
```

*FIG. 28*

```
EP602CC                                              PAGE ***
*******                                              ********

ACTION          (I=INQUIRY, A=ADD, C=CHANGE, D=DELETE, L=LIST)──252
KEY
  CONTRACT SCHEDULE                    *****
  PROD TYPE                            **
ARGUMENT
  DESCRIPTION   **************************
  WIDTHS                                     ..  :  :  :  :  :
                                             ..  :  :  :  :  :
                                             ..  :  :  :  :  :
                                             ..  :  :  :  :  :

****************************************************************
PF1=TABLE MENU  PF4=NEXT SCREEN  PF5=PRIOR SCREEN ──254
```

*FIG. 29*

```
EP603CC                                              PAGE ***
********           MATRIX PRICING - COMPOSITION      ********-252
ACTION     (I=INQUIRE CURRENT, A=ADD, C=CHANGE, D=DELETE, L=LIST)
KEY
 CONTRACT SCHEDULE              *****      PRICE FACTOR   ....
 STUB LENGTH                     ..        EFF. FACTOR    ....
 PROD TYPE                       **        WIDTH          ....
 PLY NUMBER                      ..        CONSTRUCTION   ....
ARGUMENT
 BASIC COMPOSITION CHARGE  STD.      EXCP.       EFF FACTOR   REMARKS
                          ********  ********    ......       ....
     RULES                ********  ********    ......       ....
      ....                ********  ********    ......       ....
      ....                ********  ********    ......       ....
      ....                ********  ********    ......       ....

************************************************************-254
PF1=TABLE MENU PF2=RETURN  PF4=NEXT SCREEN PF5=PRIOR SCREEN
```

*FIG. 30*

EP611CC                                                              PAGE ***
******  SELECT PRICING RULES FOR MATRIX SCHEDULE   *  -     *******
RULE
NO.
**
**
**
**
**
**
**
**
**
**

*********************************************************************
PF1=RETURN TO EP603CC  PA1=PAGE FORWARD  PA2=FIRST PAGE  PF2=SUBRULE LIST ~254

*FIG. 31*

```
EP604CC                                                              PAGE ***
********                                                             ********
                          MATRIX PRICING - SET-UP
ACTION         (I=INQUIRE CURRENT, A=ADD, C=CHANGE, D=DELETE, L=LIST)──252
KEY
  CONTRACT SCHEDULE                    *****          PRICE FACTOR   ....
  STUB LENGTH                          ..........     EFF. FACTOR    ....
  PROD TYPE                            **             WIDTH          ....
  PLY NUMBER                           ..             CONSTRUCTION   ....
ARGUMENT
  BASE SET-UP CHARGE         STD.         EXCP.          EFF FACTOR           REMARKS
                          ********     ********                               ........
          RULES           ********     ********            ........           ........
            ........      ********     ********            ........           ........
            ........      ********     ********            ........           ........
            ........      ********     ********            ........           ........
            ........
            ........
************************************************************************************
PF1=TABLE MENU  PF2=RETURN  PF4=NEXT SCREEN  PF5=PRIOR SCREEN──254
```

FIG. 32

EP605CC                                             PAGE 001
*******                    MATRIX PRICING - RUN CHARGES                ******
ACTION     (I=INQUIRE CURRENT, A=ADD, C=CHANGE, D=DELETE, L=LIST)—252
KEY
  CONTRACT SCHEDULE           *****         PRICE FACTOR    ........
  STUB LENGTH                  **           EFF. FACTOR     ........
  PROD TYPE                                 WIDTH
  PLY NUMBER                                CONSTRUCTION    ..
ARGUMENT
  OPPOSITE DIMENSIONS:  BOND
                              EFF.                                      EFF.
WIDTH   STD. CHG.  EXCP. CHG. FACTOR  WIDTH   STD. CHG.  EXCP. CHG.   FACTOR
****  *****  *****  ......  **  *****  *******   ......
****  *****  *****  ......  **  *****  *******   ......
****  *****  *****  ......  **  *****  *******   ......
****  *****  *****  ......  **  *****  *******   ......
****  *****  *****  ......  **  *****  *******   ......
******************************************************************************
PF1=TABLE MENU  PF2=RETURN  PF4=NEXT SCREEN  PF5=PRIOR SCREEN  PF6=ADDL WIDTHS—254

*FIG. 33*

```
EP606CC                                                              PAGE 001
********           MATRIX PRICING - ADD'L CHARGES                 ********  ~252
ACTION       (I=INQUIRE CURRENT, A=ADD, C=CHANGE, D=DELETE, L=LIST)
KEY
  CONTRACT SCHEDULE                             *****   PRICE FACTOR
  PROD TYPE                                     **      EFF. FACTOR  ........
  STUB LENGTH                                                        ........
  WIDTH                                         QUANTITY             ........
ARGUMENT
         FLAT    FLAT    EFF.     RUN     RUN     EFF.
         STD.    EXCP.   FACTOR   STD.    EXCP.   FACTOR        REMARKS
RULES  ******* ******* .......  ******* ******* .......
       ******* ******* .......  ******* ******* .......
       ******* ******* .......  ******* ******* .......
       ******* ******* .......  ******* ******* .......
       ******* ******* .......  ******* ******* .......
       ******* ******* .......  ******* ******* .......
 .....   ....    ....   .....    ....    ....    .....           ......
*************************************************************************** ~254
PF1=TABLE MENU  PF2=RETURN  PF4=NEXT SCREEN  PF5=PRIOR SCREEN  PF6=PAGE FRWRD
```

*FIG. 34*

```
EP608CC                                                           PAGE ***
*******                                                           ********  ~252
ACTION          MATRIX PRICING - VOL. DISCOUNTS
                (I=INQUIRE CURRENT, A=ADD, C=CHANGE, D=DELETE, L=LIST)
KEY
  CONTRACT SCHEDULE      *****
  PROD TYPE              **
  STUB LENGTH            ........    ........
  DOLLAR VALUE (OR QTY IN 1000'S)
ARGUMENT
  DOLLAR/QTY INDICATOR            (D OR Q)
  WIDTH    DISC.          WIDTH    DISC.          WIDTH    DISC.
  ******   ......         ******   ......         ******   ......
  ******   ......         ******   ......         ******   ......
  ******   ......         ******   ......         ******   ......
  ******   ......         ******   ......         ******   ......
  ******   ......         ******   ......         ******   ......
***************************************************************************
PF1=TABLE MENU  PF2=RETURN  PF5=PRIOR SCREEN ~254
```

FIG. 35

```
EP607CC                                                              PAGE ***
*******        MATRIX PRICING - MAT'L UPCHARGES                      ********——252
ACTION         (I=INQUIRE CURRENT, A=ADD, C=CHANGE, D=DELETE, L=LIST)
KEY
 CONTRACT SCHEDULE                                    PRICE FACTOR  ......
 PROD TYPE                                            EFF. FACTOR   ......
 WEIGHT
 COLOR
 GRADE
 IMAGE
 STUB LENGTH
ARGUMENT                    EXCP.                              STD.        EXCP.
 WIDTH       STD. UPCHARGE  UPCHARGE      WIDTH             UPCHARGE     UPCHARGE
  ......     ***********    *********     ......           **********   **********
  ......     ***********    *********     ......           **********   **********
  ......     ***********    *********     ......           **********   **********
*********************************************************************************
PF1=TABLE MENU  PF2=RETURN  PF4=NEXT SCREEN  PF5=PRIOR SCREEN  PF6=ADDL WIDTHS——254
```

CUSTOM PRODUCT ESTIMATING AND ORDER PROCESSING SYSTEM

CROSS REFERENCE TO RELATED APPLICATION

This application is a continuation-in-part of U.S. patent application Ser. No. 08/295,385, filed Aug. 24, 1994 now abandoned, the entire subject matter of which is hereby incorporated herein by reference for all purposes.

FIELD OF THE INVENTION

The invention relates to a computer-based system and method for estimating and ordering the custom manufacture of an item such as a business form.

BACKGROUND OF THE INVENTION

Most businesses and other types of organizations rely on a large variety of consumable products such as forms, labels, diskettes, computer paper and computer supplies to collect, store and distribute important information. These organizations can benefit from a comprehensive management system for these information-processing products which can include on-screen form and label design, database management, inventory management, and automated entry of orders and other types of data.

Manufacturers of business information products such as forms and labels generally employ a number of sales representatives located both at the corporate office(s) and offices remotely located therefrom. The sales representatives interact with customers, that is, businesses requiring office supplies such as forms and other products for recording and distributing business-related data, to determine the format and content of a form, label or other product which best suits the customers' data collection and management needs. Following form design, the sales representative generates an order to specify the number of forms be printed, form size, paper quality, ink color, print type, number of plies, requested shipping dates, and fastener type, among other information. Order generation is typically a manual process for the sales representative. Thus, the customer interaction process can be arduous and time-consuming because of the multitude of options that are considered when designing and ordering a form.

After a detailed order is created, a sales representative typically forwards the order electronically or by regular mail to a central corporate office. The order is usually processed at the manufacturer's corporate office to select, from among a number of manufacturing plants co-located with or remotely located from the corporate office, the best equipped plant to fulfill the order. The order is finally forwarded to the selected plant, which manufactures and ships the product in accordance with the specifications in the order. The corporate office generally also performs accounting functions to bill the customer for the manufactured products.

The manner in which an order is generated and processed can vary depending on the business forms manufacturing system. In some systems, the form design and ordering process is done manually by a sales representative, that is, the content of the form and the order are written by the sales representative or customer on paper or electronic forms designed for these processes. The sales representative typically determines the sale price based on data in a pricing manual or available in the memory of a computer. After the representative enters the sell price onto the ordering form, the representative submits the form and the completed order to the manufacturer's order receiving office by facsimile or mail.

Another type of business forms manufacturing system automates the design and ordering of forms by the remotely located customer or sales representative. The system is organized in essentially the same manner described above. It comprises a manufacturer's computer at a central corporate office which communicates with several remote customers' or sales representatives' personal computers (PCs), and computers at the production facilities or plants. The form is designed on a remote PC using a form design software program. The form parameters are automatically transferred to a second software program for ordering, which permits a user to enter additional parameters such as order quantity and delivery information. The PC proceeds to complete the order by automatically calculating price in accordance with the entered parameters and the ordering software. The form and the completed order are subsequently simultaneously transmitted in machine format (i.e., electronically or on disk by mail) to the manufacturer's computer, which confirms the order and determines the best printing facility or plant. The order and form are finally transferred electronically to the selected printing facility.

To compete with other manufacturers of paper and electronic business forms, manufacturers seek to improve their form design and ordering systems and therefore their sales transactions with customers by improving the accuracy of cost and/or list price calculations, and reducing the paperwork and the time spent by sales representatives when performing price estimation and order entry. As explained above, one way manufacturers seek to improve their ordering systems is to automate the ordering process by including automatic price calculations at the sales representative's remote computer. These price estimates, however, are problematic because the sales representatives' computers may not be equipped with the most recent pricing data. Pricing data changes frequently due to a variety of factors such as variable material and labor costs. These changes need to be downloaded regularly to the sales site computers. This can result in inconsistencies in the price estimates calculated by different sales representatives.

For the above reason, among others, predominantly centralized storage of pricing information and consultation between a remote sales site and the manufacturer's corporate office during cost estimation is advantageous. The centralized storage of information also allows for flexibility in pricing to reflect, for example, pricing agreements between certain customers and the manufacturer. Further, the stored pricing data can be continuously updated with data received from different sources, such as manufacturing plants, which can monitor and report actual job and material costs to the manufacturer. Consultation with the corporate office for centralized storage of cost data eliminates the problem of having to continuously update the data at the sales representative's site in order to keep all representatives apprised of the same pricing information.

While it may be possible for the remote computer to access the central database information in order to perform the estimate calculation itself, it is more advantageous for estimate calculation to be performed at the headquarters and then forwarded to the sales site because pricing data and algorithms can be proprietary and, therefore, are best kept for security reasons at a central location for security reasons. Further, centralized storage of price data preserves the integrity of data better than if it were distributed to each of the remote sales computers. Accordingly, a centralized storage system for price data requiring consultation between the different sales representatives and the corporate office system promotes more consistent estimates from the sales representatives.

A disadvantage to calculating price entirely at the sales site, that is, without requiring the exchange of any pricing data with the corporate office during the estimation process, is the lack of corporate office control over the list price offered by the sales representative to the customer. Such control may be desirable for a number of reasons. For example, simple forms such as one-sided, single-ply, carbonless forms can be priced in a relatively straightforward manner at the sales site, provided the material and form feature cost tables consulted by most forms manufacturers for pricing are updated. The equipment set-up time, run speeds and labor required for these types of manufacturing jobs are generally known and factored into the tables. Complicated forms (e.g., multi-ply forms with carbon papers and various perforations and fasteners or hole punching requirements) that are priced using these tables, however, are more likely to be underpriced because slower equipment run speeds, longer set-up times and other factors were not taken into consideration when generating the tables. These other factors can include, for example, the ability of different plants to perform the desired manufacturing processes, and customer and/or manufacturer item-specific contract data. By involving the corporate office in the estimation process, these factors can be taken into account when appropriate. Even when complex forms are not involved, the corporation may simply wish to have corporate office personnel review a sales representative's estimate, for example, because a proposed job exceeds a certain sell price, or involves a new or highly valued customer. Further, previous estimates that are stored at the corporate office can be used for operations and sales administration purposes. For example, previous estimates can be analyzed to locate which potential customers have been approached by a sales representative, to perform analysis such as determining how many estimates mature into product orders, and to determine which sales representatives deserve rewards for their successful endeavors or require additional training and incentives to improve their performance.

Although maintaining pricing data at a central location is advantageous for the reasons given, it generally requires a sales representative to use certain information twice, that is, once in order to get an estimate, and a second time to place an order. The need to re-enter data can be minimized by storing various parameters relating to an item specification, as well as other data relating to the customer, at the sales site and/or the corporate office, and sharing the data between different computers.

SUMMARY OF THE INVENTION

The order processing system of the present invention overcomes many of the limitations of known business form manufacturing systems, while also realizing a number of advantages over such systems. In accordance with one aspect of the invention, a sales site computer is programmed to facilitate the entry of design parameters for creating a form and estimate parameters to obtain estimate data from a manufacturer's corporate office, and to store these parameters for later use in a production order. Computers at the sales site, plant and corporate office locations are networked and are programmed in a manner which maximizes the integration of different software systems and therefore the ability to share data between the various components of the system of the present invention. The amount of information the sales representative or customer re-enters during the creation of a production order is therefore minimized. Further, specifications for an item order are captured in a memory device and can be used for repeat orders.

In accordance with another aspect of the present invention, a computer and a database are provided at the manufacturer's corporate office for storing standard price tables and calculating cost and/or list price estimates based on the tables and the item specifications and estimate parameters, which were entered by a sales representative or customer at the sales site and transmitted, preferably electronically, to the corporate office.

In accordance with still another aspect of the present invention, custom price matrices are created to generate customer-specific estimates in accordance with a contract agreement between the manufacturer and the customer.

Further, the corporate office computer and database are configured to manage contract information by maintaining contract parameters on-line, and monitoring contract performance and compliance using system analysis and reporting.

BRIEF DESCRIPTION OF THE DRAWINGS

These and other features and advantages of the present invention will be more readily apprehended from the following detailed description when read in connection with the appended drawings, in which:

FIGS. 5 through 27 depict computer monitor screens which are generated to prompt a sales representative or customer to enter item specification information used at least in part to generate estimate data; and FIGS. 28 through 36 depict computer monitor screens for prompting a user to enter information used for the generation of a contract price matrix.

DETAILED DESCRIPTION OF THE PREFERRED EMBODIMENT

Figure 1:
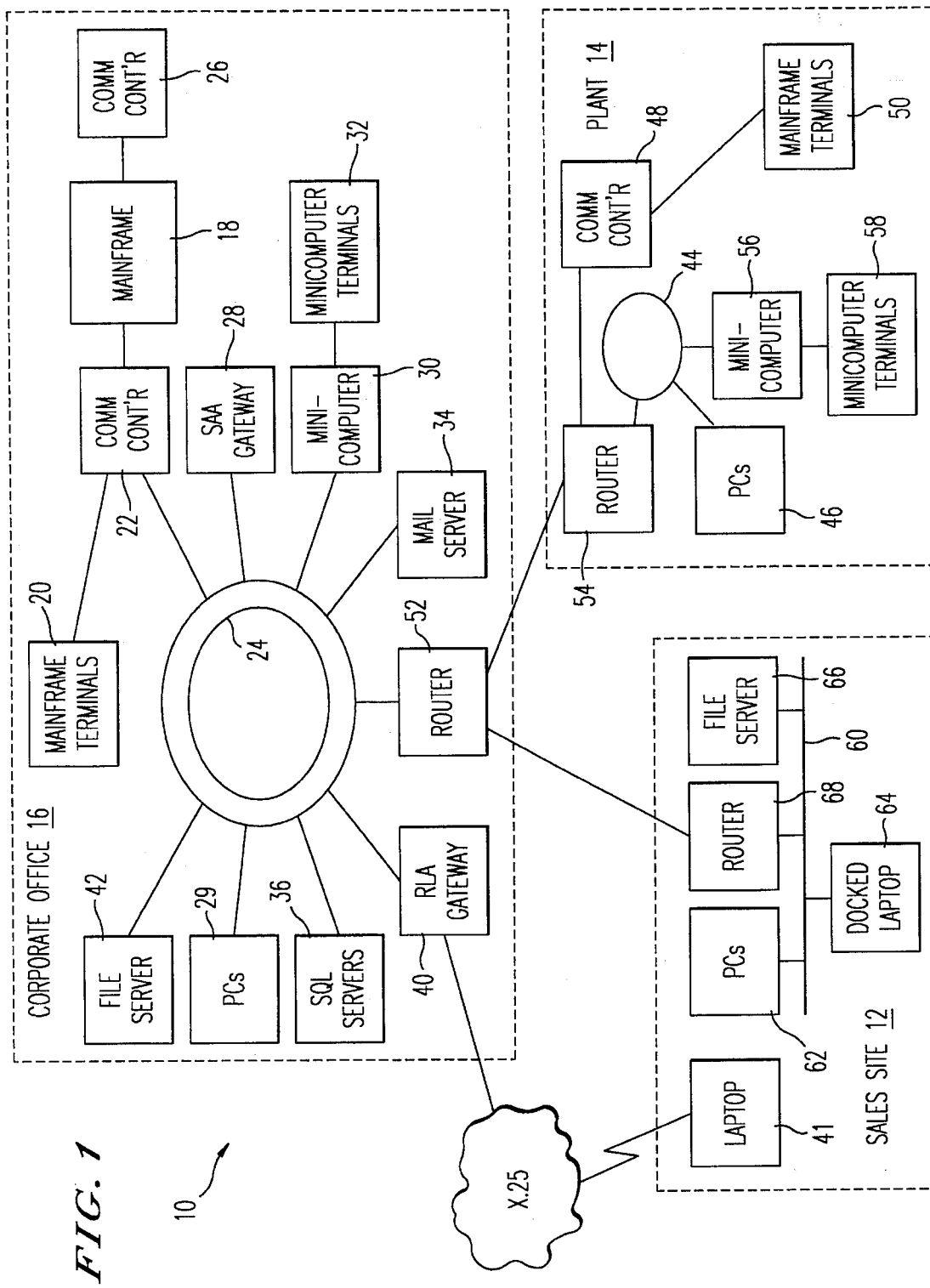
FIG. 1 is a schematic block diagram depicting corporate office, sales and plant hardware subsystems in a product estimating and order processing system constructed in accordance with the present invention.

FIG. 1 depicts an estimating and order processing system 10 for constructed in accordance with the present invention. The order processing system 10 comprises one or more sales offices or sites 12 (which may be dedicated offices or simply desk top computers operated by sales representatives at the customers' offices), and one or more manufacturing plants 14, which are both connected to at least one corporate office 16 by communication links as described below. In general, the sales offices and plants are remote, although they can be co-located with the corporate office. The computer-based systems at the corporate office 16, the sales site 12 and the plant 14 and their interconnecting communication links collectively form a wide area network (WAN).

The corporate office 16 comprises at least one computer for performing a number of processes, and coordinating the activities of other computers located at the corporate office and remote locations (e.g., the sales sites and plants) in performing these processes. The processes include, but are not limited to, tracking inventory at both a corporate storage site and a customer storage site, accounting, purchasing, managing customer contracts, and determining labor and actual material costs to produce orders. For illustrative purposes, the corporate office 16 can comprise an IBM 3090 mainframe computer 18 connected to a number of mainframe computer terminals 20, which communicate with the mainframe computer over dedicated digital lines via a communication controller 22. The communication controller 22 also connects the mainframe computer and the mainframe terminals to a data communications network 24 such as a local area network (LAN). Another communication controller 26 can also be provided to connect leased telephone lines from terminals (not shown) through the mainframe computer to the LAN via a router.

With continued reference to FIG. 1, the corporate office 16 also comprises a Systems Application Architecture (SAA) gateway 28 for allowing IBM-compatible personal computers 29 to access the mainframe computer across the LAN 24. A minicomputer 30 and a number of associated minicomputer terminals 32 are connected to the LAN 24 for corporate development purposes. A mail server 34 supports messaging within the corporate office, as well as with terminals and computers at sales sites and plants. At least one Structured Query Language (SQL) server 36 is provided to support estimation and order entry applications by allowing remote computers to access a database of shared data and program files which is maintained at the corporate offices and described in further detail below. A Remote Local Area Network (LAN) Access gateway 40 or RLA gateway is provided to permit dial-up connections between sales representatives conducting business outside of a sales office (e.g., on a desk top computer) and the LAN 24.

The plants 14 are each preferably provided with a LAN 44, as shown in FIG. 1, to support users working on a number of PCs 46 to provide data to the corporate office SQL server or database 36, as well as to send messages via the mail server 34. Other processes performed at a plant can include, but are not limited to, managing raw material inventory, scheduling and tracking jobs, shop floor data collection, production reporting and job planning, and providing the corporate office with data concerning the planned use of materials, materials requisitions, and the actual consumption of materials and labor during job execution for comparison with the corresponding estimate. As described in connection with the corporate office, each plant is preferably provided with a communication controller 48 to connect mainframe computer terminals 50 located at plant sites to the mainframe computer 18 at the corporate office over the LAN 24 via routers 52 and 54. A minicomputer 56 such as the IBM minicomputer model number AS/400 and associated AS/400 terminals 58 are connected to the token ring 44.

As shown in FIG. 1, the sales offices each preferably comprise a LAN 60 to interconnect a number of PCs 62 and/or docked laptop or portable computers 64. A file server 66 can be connected to the LAN 60 to support shared data between multiple PC users. A router 68 is connected to the LAN 60 to interconnect the sales office with the corporate office with dial backup capabilities. Sales representatives can also access the corporate office using, for example, their portable computers via the RLA gateway.

The system hardware architecture described in connection with FIG. 1 facilitates maintenance of remote systems such as the sales office and plant subsystems, and the distribution of software to these subsystems by allowing for the sharing of data between the platforms e.g., of the mainframe computer 18, the minicomputers 30 and 56 and the personal computers 29, 46 and 62. In addition to messaging, the corporate office LAN24 supports a number of applications, which can also be supported by the LANs at the sales office and plant sites, such as word processing, data analysis, ad-hoc reporting, among other office administrative functions. Further, the networking of the PCs at the sales offices and plants facilitates order estimation and entry, as well as the electronic transmission, of production orders and copy folder information to the plants from the corporate office LAN. Copy folder information generally includes specifications for manufacturing, packaging and shipping, and form usage data such as the type of printer to be used. While forms usage information is not necessary for an estimate, it is useful for plant quality control. In accordance with one embodiment, the sales offices send orders to the plants via the WAN. The WAN also allows a form design to be transmitted directly to a plant for pre-processing.

In connection with the present embodiment, printing at a plant 14 is intended to encompass any and all processes and/or the use of any type of machines or other equipment which can be employed for or utilized when preparing or producing imaging on a substrate that is to be read by machine or a human being, including, but not limited to, letter press, intaglio, gravure, lithographic, electrophotographic, xerographic, electrostatic, magnetic flexographic, ink jet, laser, thermographic and offset lithographic printing processes. It will be appreciated by those skilled in the art that the present invention is not limited to a particular type of computer, data storage device or communications hardware such as the above-described components. Further, the hardware, and the transmission paths and networks can vary depending on a variety of factors such as the number of users accessing the system and the desired data transmission speed. For the purposes of this invention, electronic transmission of data such as a business form image can include, but is not limited to, transmission via modem, facsimile and electronic data interchange (EDI), among other data transmission techniques.

The software associated with the corporate office 16, the plant 14 and the sales site 12 will now be described in connection with FIG. 2. The corporate office computer subsystems depicted in FIG. 2 comprise an Order Entry and Inventory subsystem 88 which receives release orders from a sales representative computer (e.g. computer 62), as well as from mainframe terminals located at plants and other order entry offices. Release orders are generated by sales representatives to order the release of finished goods inventory stored at any corporate storage facility through electronic ordering. This inventory includes, for example, forms that have already been produced for the customer and are warehoused at a plant or distribution facility in accordance with a warehousing agreement, and ready-made office supplies such as staplers and telephone message pads. A release order from the Order Entry and Inventory subsystem 88 or from the sales site via the Sales Information Network 86 is sent to a Distribution subsystem 80. The Distribution subsystem 80 generally operates in a warehouse remotely located from the corporate office. The Distribution subsystem determines where to store goods within the warehouse, retrieves and ships goods in accordance with release orders, and transmits data to the Order Entry and Inventory subsystem 88 for invoicing.

A sales representative can also generate production orders for the manufacture of a custom item such as a business form designed only for use by a particular customer. The generation of a production order for a custom item generally involves the transmission of item specifications for a production order to an Estimating subsystem 90. The Estimating subsystem 90 is used to generate estimate data using at least one of a number of methods described below. The estimate data is transmitted from the Estimating subsystem 90 to the sales representative site. The estimate data can be used in conjunction with other data such as the data in a copy folder to generate a production order which is sent to a plant.

Figure 2:
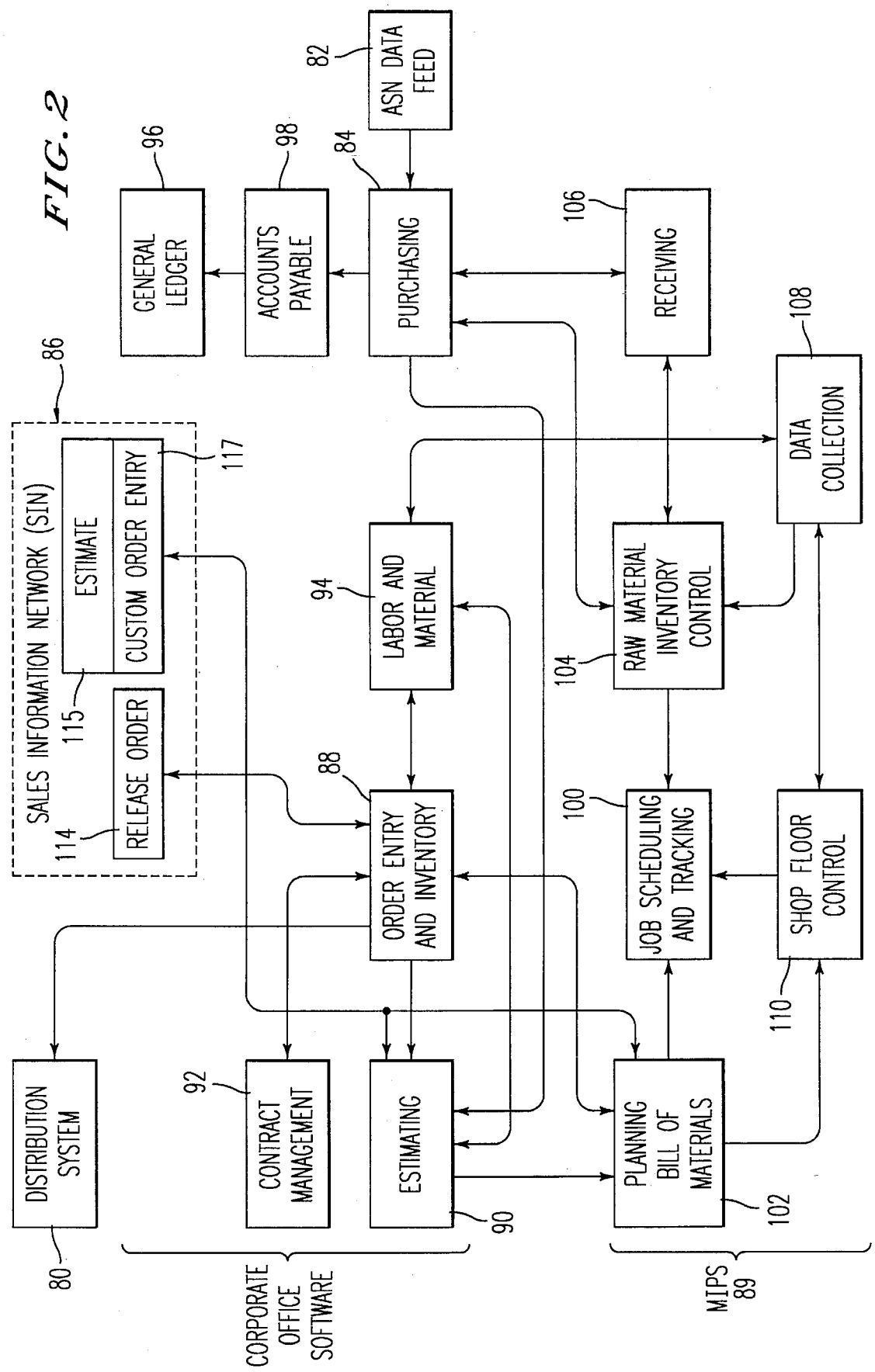
FIG. 2 is a functional block diagram depicting software subsystems associated with the corporate office, sales site and plant depicted in FIG. 1.

With continued reference to FIG. 2, the corporate office comprises a Contract Management subsystem 92 for storing customer-specific contract terms and conditions in order to resolve inquiries regarding this information made by sales representatives and customers, and to determine the degree to which customers have complied with their contracts, among other uses. The contract data can include a customer/item relationship comprising contract pricing information for customer contract items.

The corporate office further comprises a Labor and Material subsystem 94, a General Ledger subsystem 96, an Accounts Payable subsystem 98, a Purchasing subsystem 84 and an Advanced Shipping Notice (ASN) Data Feed module 82. The ASN module 82 interfaces with the Purchasing subsystem 84, which in turn transmits data to the various plants comprising paper roll identification numbers.

As will be described below in connection with the Manufacturing Information Processing System (MIPS), a Raw Material Inventory Control subsystem 104 and a Data Collection subsystem 108 monitor the materials used in the plants for fulfilling customer orders. The plant 14 provides data from the Data Collection subsystem 108 to the Labor and Material subsystem 94 and to the Estimating subsystem 90 relating to the materials and equipment used, as well as the labor required, to fulfill a particular order. The data from the Data Collection Subsystem 108 is used for performing actual cost analysis at the corporate office, for job planning at the plant and, once the actual materials used to complete an order have been determined, for updating a Planning Bill of Materials subsystem 102 and the Raw Material Inventory Control subsystem 104. The plant 14 can therefore provide data to the sales site regarding the status of an order for improved customer service. Further, the Purchasing subsystem 84 and the Raw Material Inventory Control subsystem 104 or the Labor and Material subsystem 94 provides the Estimating subsystem 90 with information concerning material attributes such as weight, paper grade, paper or ink color, material codes and material quote information (e.g., quote number, effective date, and material price) and therefore facilitates the process of determining more accurate estimates for the cost of fulfilling a customer order. Similarly, the Labor and Material subsystem 94 provides the Estimating subsystem 90 with standard material cost information, actual job information received from the Job Scheduling and Tracking subsystem 100 in the various plants, as well as actual production information such as waste percentages, feet per run hour and actual material usage.

Information from the plant is also used by the General Ledger subsystem 96 to generate accounting journal entries. As stated previously, the Raw Material Inventory Control subsystem 104 and the Data Collection subsystem 108 monitor the materials used in the plants for fulfilling customer orders. The Purchasing subsystem 84 receives requisitions from the Raw Material Inventory Control subsystem 104. When the material receipt is received, it is used to update the Raw Material Inventory Control subsystem via the Receiving System 106. This information is provided to an Accounts Payable subsystem 98 for automatically tracking the accounts payable to the various vendors of these supplies. The Accounts Payable data is also provided to the General Ledger subsystem 96.

MIPS 89 is used by a manufacturing plant 14 to manage jobs for cost efficiency and can, for example, be stored in the memory of the plant minicomputer 56. MIPS comprises a plurality of software subsystems which are shown in FIG. 2. The Planning Bill of Materials subsystem 102 determines the materials, shop equipment, and processing time required to fulfill an order based on item specifications in a production order. An advantage of the order processing system 10 of the present invention is that the item specifications are stored in a memory device after they are transmitted to and received at a plant and therefore do not have to be re-entered in the plant or the corporate office computer systems. The Job Scheduling and Tracking subsystem 100 can schedule the completion of jobs in a manner which improves plant efficiency. For example, the MIPS 89 can schedule several jobs for different customers to be processed at the same time because the jobs require the same color ink or the same number of plies. The Shop Floor Control subsystem 110 monitors where a product is located at a given point in time during the plant manufacturing process and provides this data to the Job Scheduling and Tracking subsystem 100.

MIPS 89 further comprises a Raw Materials Inventory Control subsystem 104 for monitoring supplies (e.g., paper, ink), and informing the Purchasing subsystem 84 when raw materials are needed. A Receiving subsystem 106 monitors the receipt of raw materials for custom product manufacturing, as well as receipt of finished goods, e.g., release order forms that have already been produced and are being warehoused, and office supplies such as staplers that are offered for resale in a catalogue along with the release forms. A Data Collection subsystem 108 collects data relating to materials and labor used per job, per customer and per plant. This data can be used for internally monitoring the performance of the plant. This data can also used by the Labor and Materials subsystem 94 for cost accounting.

Figure 3:
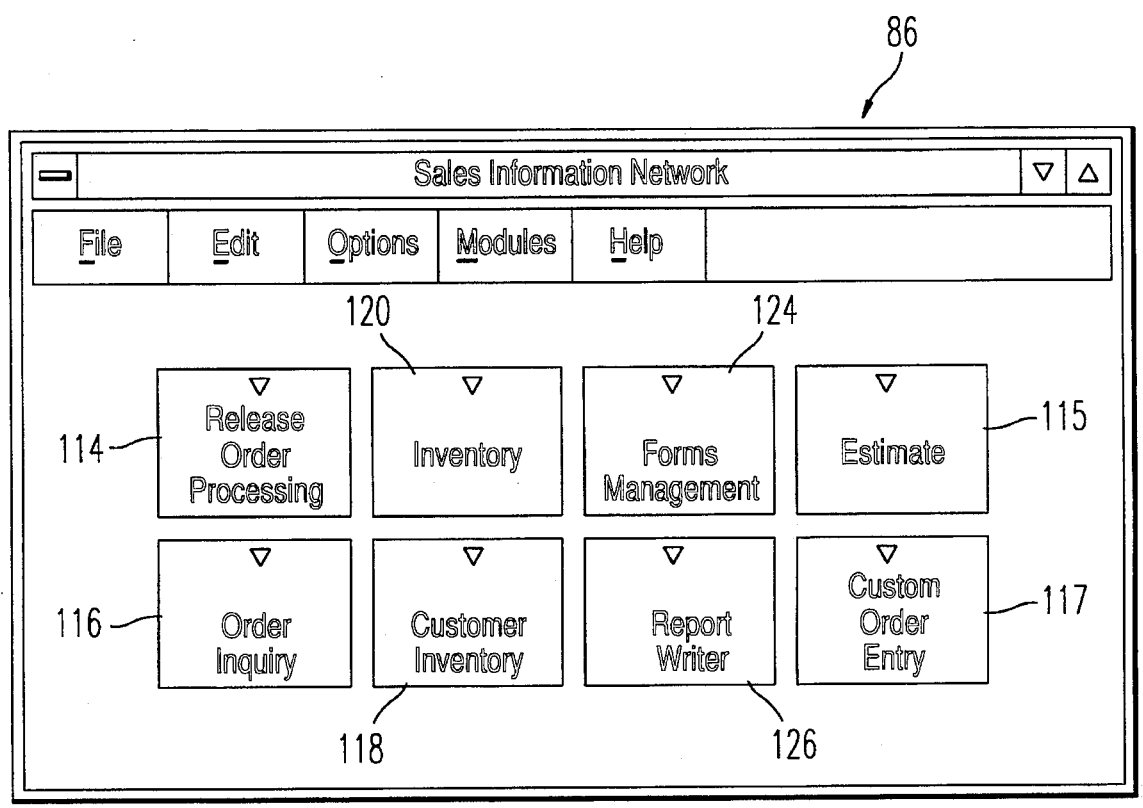
FIG. 3 depicts a computer monitor screen generated by the sales information network software employed at the sales site of FIG. 1.

The subsystems of the sales representative system or Sales Information Network (SIN) 86 will now be described in connection with FIG. 3. The SIN software is preferably stored in the memory of the personal computers 62 and 64 used by the sales representatives. SIN software can also be provided on terminals for use by customers. FIG. 3 depicts a screen which is generated on a sales representative's computer monitor, for example, in accordance with a WINDOWS™ or equivalent software application. The user can select a particular menu option using a mouse, the keypad or a touch screen.

With reference to FIG. 3, the sales representative can begin entering item specifications for producing a custom business form by selecting the Estimate subsystem 115. These specifications are used in conjunction with data at the corporate office to generate an estimate for the manufacturing of the form. The item specifications entered in the Estimating Subsystem 115 generally do not need to as comprehensive as the item specifications entered in the Forms Management Subsystem 124. The information needed to obtain estimate data is typically less than that required to instruct a plant on how to manufacture a custom item.

If the customer finds the estimate to be agreeable, the sales representative can select the Custom Order Entry subsystem 117 and begin entering additional information that is useful to generate a production order such as shipping information. The production order is then preferably electronically transmitted to a plant.

The Release Order Processing subsystem 114 permits a sales representative to enter release orders to order the release of inventory stored at any corporate storage facility, preferably via electronic data interchange (EDI) ordering. The EDI orders can be electronically transmitted throughout the WAN and ultimately to a plant or distribution facility 12, which is preferably the facility that is located closest to the destination point of the ordered goods. This reduces freight cost for the customers, as well as expedites delivery. The sales representative can create a new release order or open a file to an existing release order by highlighting the proper menu option on a main release order screen and striking the enter button on the keypad or mouse. In addition to creating new release orders, editing existing release orders, and saving and printing release orders, the sales representative can transmit release orders to the Order Entry and Inventory subsystem 88 at the corporate office, as well as receive release order acknowledgments. To save time, information that is frequently used by a customer to order the release of goods from inventory can be entered into a template. For example, information from the corporate office (e.g., the SQL server 36) relating to a customers ship-to and sold-to addresses can be entered once into a template for subsequent uses, eliminating the need to enter these addresses at a later time. Thus, the template-based system improves accuracy and speed.

The Order Inquiry subsystem 116 (FIG. 3) permits a representative to access information electronically regarding the status of a release or production order. A query function is provided to allow the sales representative to find any order by searching the database for such references as user location, production order number, item number, or any other criteria that the representative defines in a previously placed order. When a particular order is found in the database, an order status code is presented by the PC in accordance with the subsystem to inform the representative if all items in an order were shipped or, in the case of a release order, if a back-order was required. Additional information regarding release orders is provided to inform the representative of the originating warehouse location, the shipping date, the shipping carrier, as well as coding for orders supplied from more than one warehouse. Data from the different plants is provided to the Order Entry and Inventory Subsystem 88, which can be used to track the completion of a production order as explained above in connection with FIG. 2.

The Customer Inventory subsystem 118 (FIG. 3) allows either the customer or the sales representative to track inventory at the customer location. Two methods are provided for tracking inventory. The first method employs inventory counts, that is, counting receipt, on-order, and ending inventory amounts and entering them into the system at the end of the month. The second method employs bar codes for perpetual inventory monitoring, that is, scanning bar codes on inventory items indicating receipt, on-order, usage and transfer transactions on a daily basis or as they occur. This subsystem offers the customer valuable information to prevent stock-out situations, as well as useful trend usage analysis. If the inventory database is kept up-to-date, the customer inventory subsystem can offer additional benefits such as ad-hoc query creation and reports, which help users to track inventory and overall usage of their products.

The Forms Management subsystem 124 (FIG. 3) allows either the customer or the sales representative to maintain items such as forms and labels and their associated specifications electronically. The subsystem is generally an electronic database of item specifications and copy folder information. The sales representative or customer can create a form, as explained in further detail below, or scan an existing form into the SIN 86, and then match the on-screen image of the newly created or scanned document to a computer file. The sales representative or customer can subsequently organize, sort and manipulate the specification and corresponding copy folder information that defines every form and label within the database electronically. An exemplary specification sheet is shown in Appendix A. The specification sheet comprises an area for entering general information such as customer number and product type, an area to enter usage information such as storage terms and foreign numbering, an area for entering construction information such as the number of plies, the paper weight, width and color and grade, an area to enter fastening information such as location and the number of carbons, and finally the color of inks used on the form.

A menu option within the Forms Management subsystem permits a representative to create an on-screen form using a form design software such as the Perform Pro Plus Forms design software developed by Delrina Technology, Inc. of Canada. Thus, a sales representative or customer has the convenience of on-site laser proofs of newly created forms and therefore fast response to user requests. The Forms Management subsystem 124 permits a customer or sales representative to eliminate and consolidate forms, reduce procurement costs and build a foundation for forms automation. For example, a number of fields within the forms specification sheet or within the forms design itself can be stored as a template and used in later specification sheets, forms and labels, thereby reducing the need to re-enter data.

The information in the Forms Management subsystem 124 can be integrated with the information of other subsystems to essentially instantaneously determine inventory values, usage trends and to generate custom reports. The sales information network (SIN) system comprises a Report Writer subsystem 126 which allows for the generation of custom reports using the query tool to access data residing in any of the six subsystems. For example, reports can combine ordering, shipment trend and specification information. Each of the subsystems is designed with an open systems architecture so that each subsystem can work in conjunction with the a query tool and the Custom Report subsystem 126, as well as with the corporate office information systems (FIG. 2). The information within the network can be exported to other WINDOWS™ compatible programs.

The data stored at the corporate office 16, the plant 14, and the sales site 12 (FIG. 1) will now be described. In accordance with an embodiment of the present invention, the SQL server 36 at the corporate office 16 maintains the following types of data in the database: item specifications (e.g., for production orders that have been submitted or for estimates that have been generated and require review by corporate office personnel); cost data for generating an estimate; contract data; production orders or order-specific information shared between sales sites and plant; and estimate information (i.e, information that is not contained in an item specification, such as the number of printings requested and storage information). The file server can be configured using, for example, a PC file server, a minicomputer or a mainframe computer. Further, other types of memory devices can be used. Finally, the SQL server 36 is preferably provided with information that can be downloaded to sales sites or plants through, for example, batch processes. This downloadable information can include, but is not limited to, order status, inventory information and validation data.

A computer (e.g., a personal computer 29) at the corporate office 16 is programmed to operate as or in conjunction with the SQL server 36 to do the following types of information processing: maintaining cost data and material quotes; reviewing and maintaining estimate matrices; maintaining estimates and item specifications; validating estimates and specification sheets; manipulating and transmitting estimate cost and list price information to sales representatives; producing order entries and maintaining them; conducting profitability analysis, as well as other types of analyses; re-routing production orders on an exception basis; and messaging.

The memory storage device(s) at the sales office 12 (e.g., the file server 66 and the laptop computer 41) preferably store information that is needed only at the local levels such as user information and modem numbers, as well as information that is generated at the local level such as item specification information. The item specification can be for both items that have and have not been transmitted to the SQL server 36 at the corporate office 16. These sales site memory device(s) can also contain information that has been downloaded from the corporate office SQL server 36. As will be described in further detail below in connection with FIG. 4, the sales office computers (whether located at a customer site or corporate sales site) are programmed to generate release orders, to generate and transmit item specifications and requests for estimates, to receive estimate data and convert an estimate into a production order, to generate and transmit a production order to the corporate office, and to perform messaging.

Each plant 14 can use, for example, a minicomputer 56 to store data that is generally only needed by the plant. A significant amount of this data is generated locally, and some data is transmitted to the plant by a sales site or the corporate office. For example, actual job and production data is generated at the plant and sent to the Labor and Material and Estimating Subsystems. Other data at the plant can include, but is not limited to, estimate data, validated item specifications and MIPS planning specifications. Using this data, each plant can maintain productions orders transmitted thereto, validate order specifications, and perform messaging.

One or more messaging servers are provided in the WAN to store and forward messages to sales sites, the plants and the corporate office. Two kinds of messages can be sent via these message servers: (1) free form message that are human readable; and (2) program interpretable messages.

Figure 6:
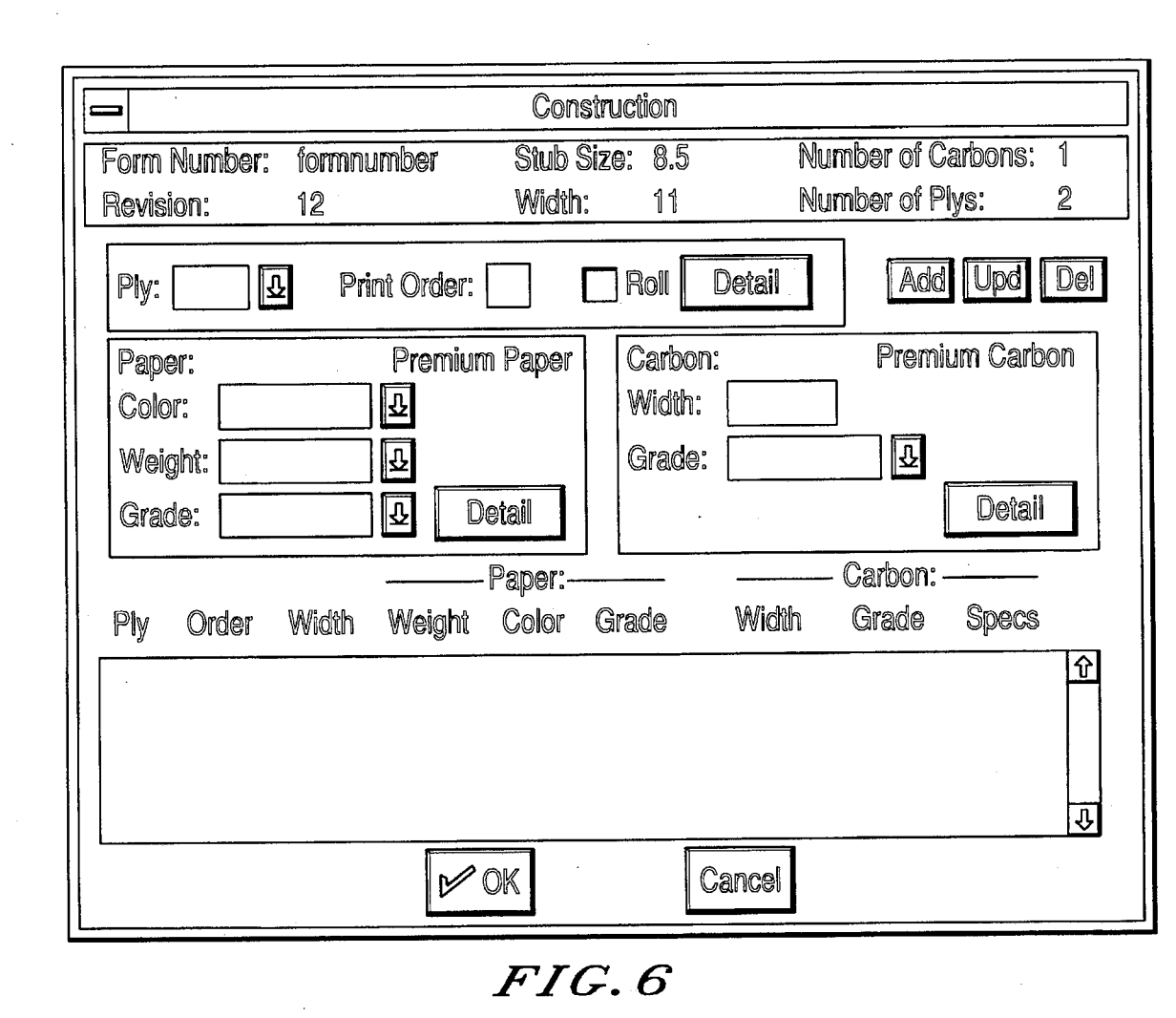
Figure 7:
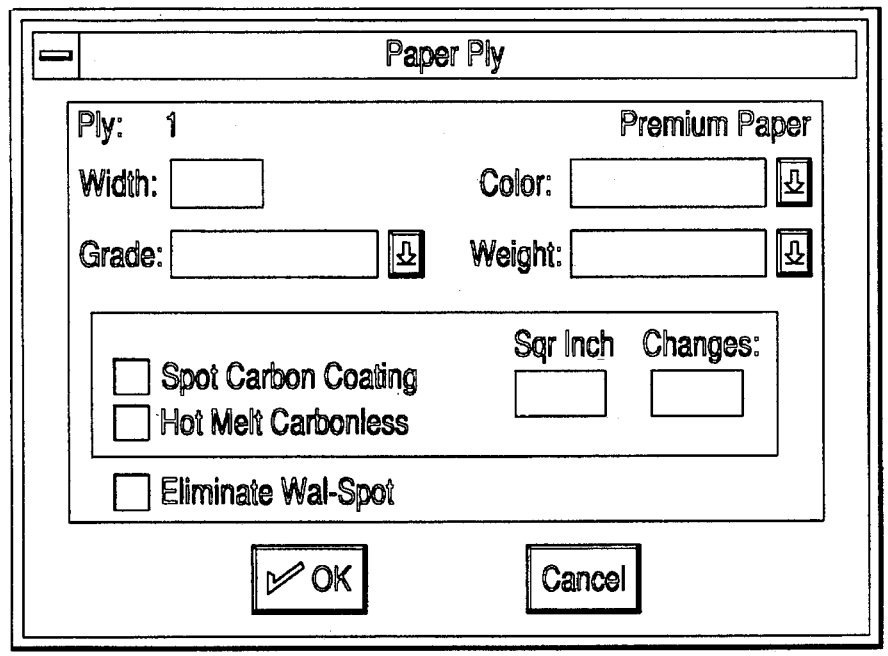
Figure 8:
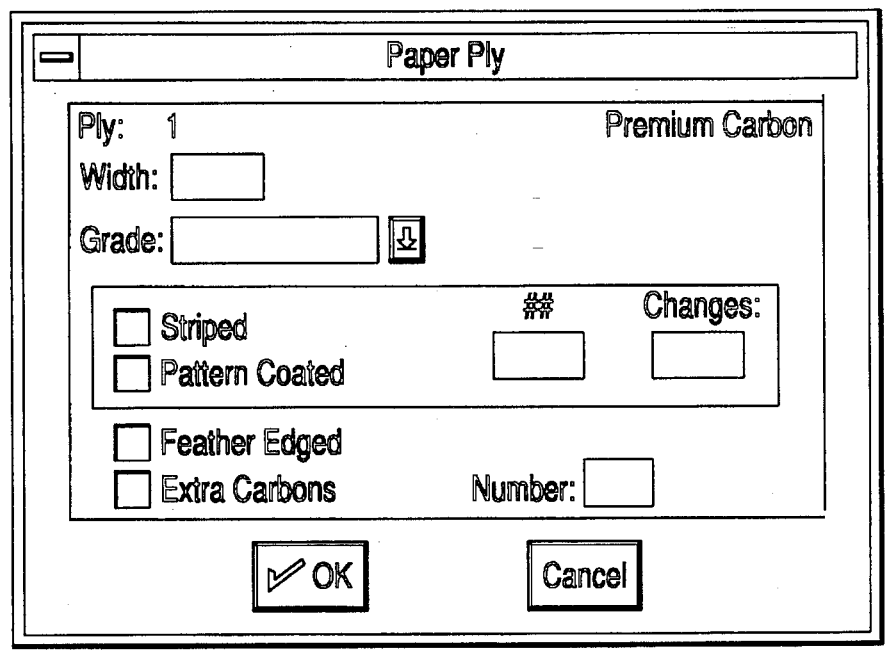
Figure 9:
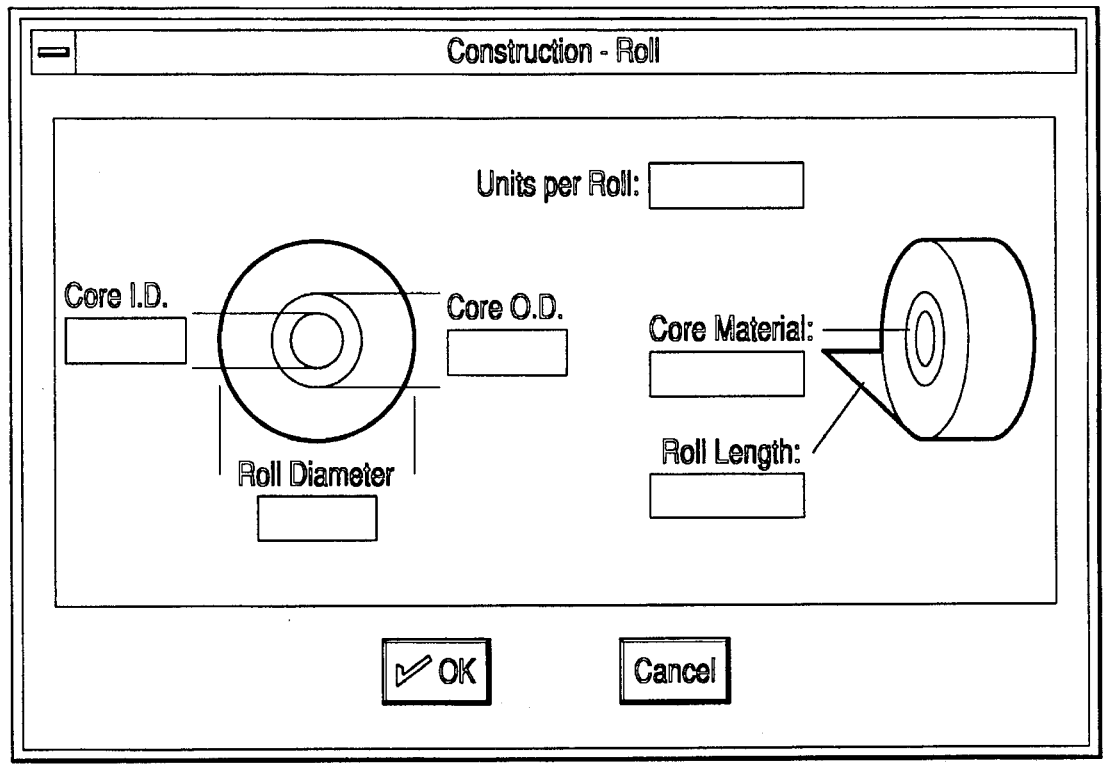
Figure 10:
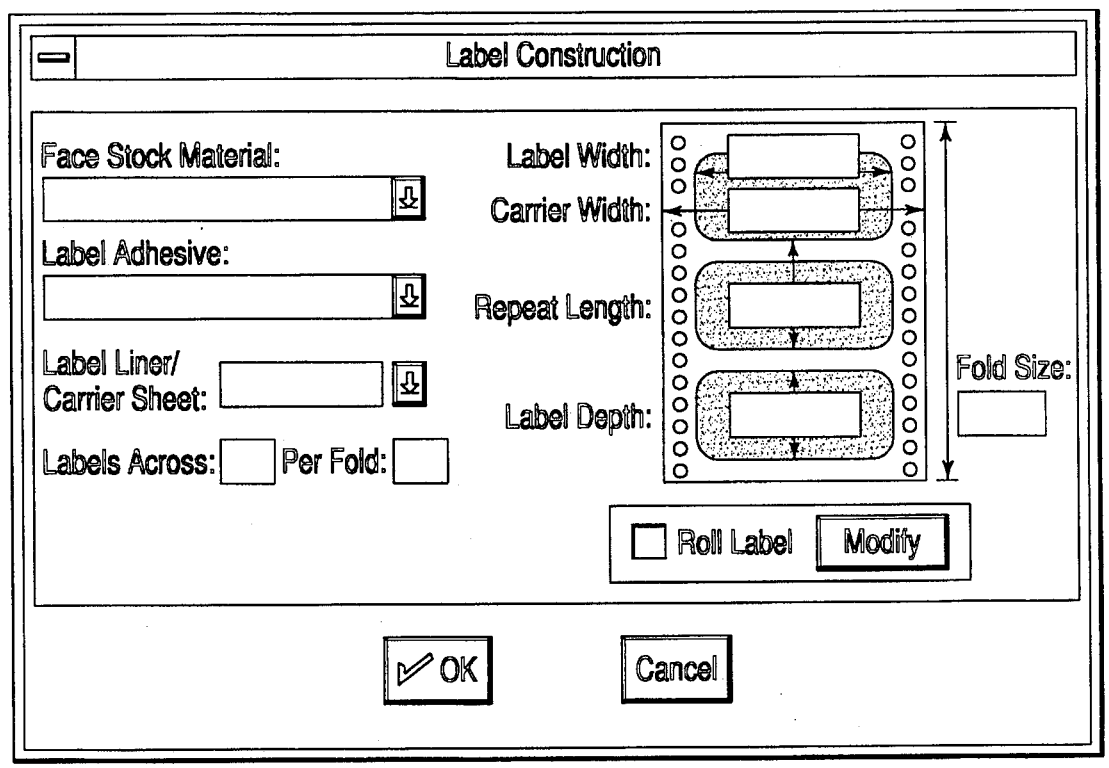

The process of generating an item specification for a business form at a sales site 12, obtaining estimate data from a corporate office 16, and ultimately forwarding a production order for the custom manufacture of the form to a plant 14 is described in connection with the flow chart depicted in FIG. 4. With reference to block 140 in FIG. 4, a sales representative determines customer requirements for a business form during, for example, a meeting with the customer, and begins to enter a corresponding item specification into a PC 62 or to modify an existing item specification by selecting the Estimate subsystem 115 from the main menu (FIG. 3) of the SIN system appearing on the PC monitor. The PC is programmed to subsequently generate the screen depicted FIG. 5. Depending on which of the menu options shown in the bottom half of the screen (FIG. 5) the sales representative selects, another screen is generated. For example, if the sales representative selects the Construction menu option, the PC generates one or more of the screens depicted in FIGS. 6 through 10 to guide the sales representative when entering such material specifications of the form as with paper grade, color and weight (FIG. 6), information regarding paper plies and special processes (e.g., spot carbon coating) that can be applied to the paper (FIG. 7), information regarding carbon sheets (FIG. 8), information about products that are delivered in a roll form (FIG. 9), and the material and desired construction of labels (FIG. 10), among other form construction options.

Figure 4A:
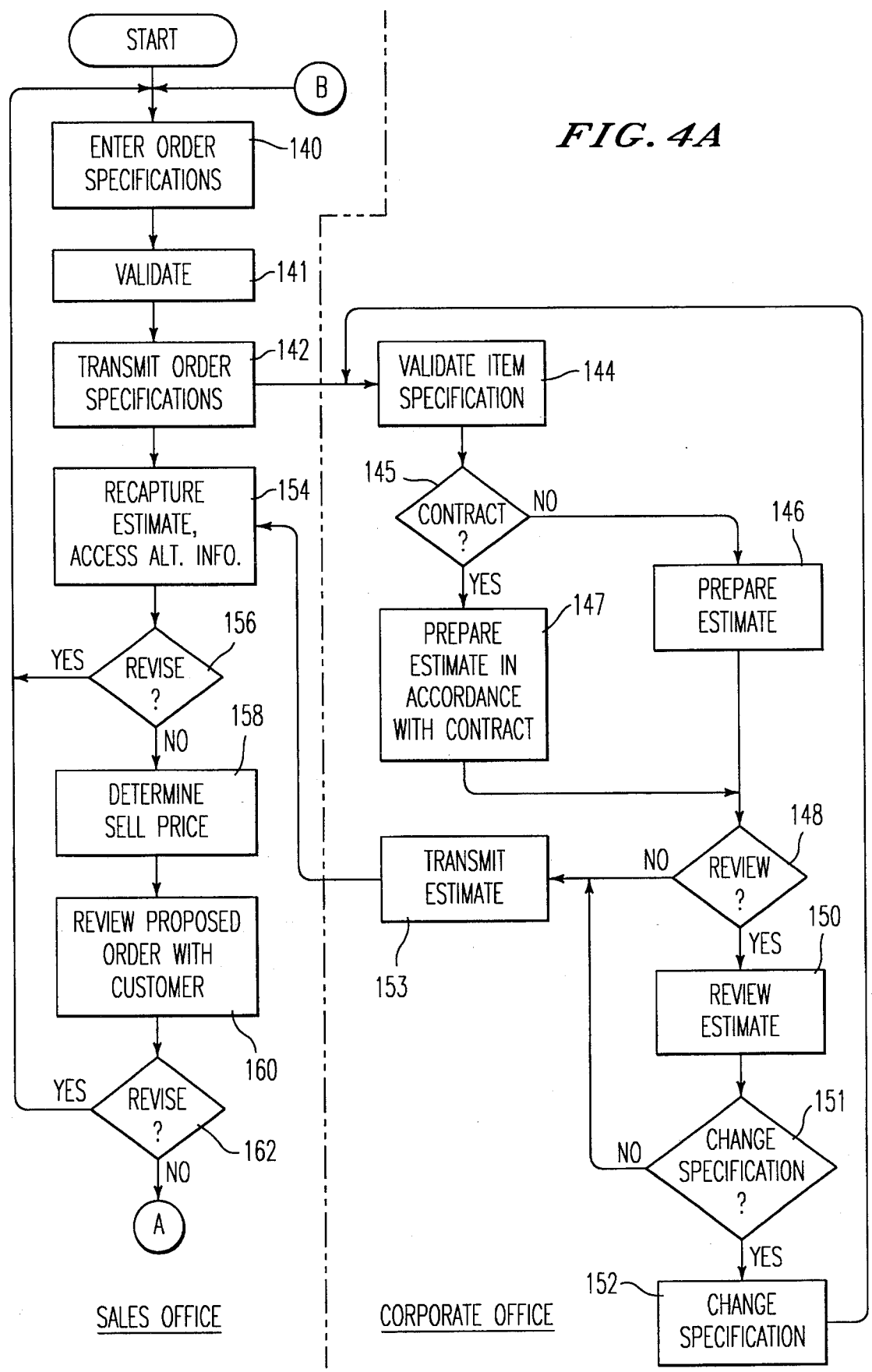
FIG. 4 is a flow chart illustrating the process of creating an item specification, obtaining an estimate, converting the item specification into a production order, and forwarding the order to a plant in accordance with the present invention.
Figure 4B:
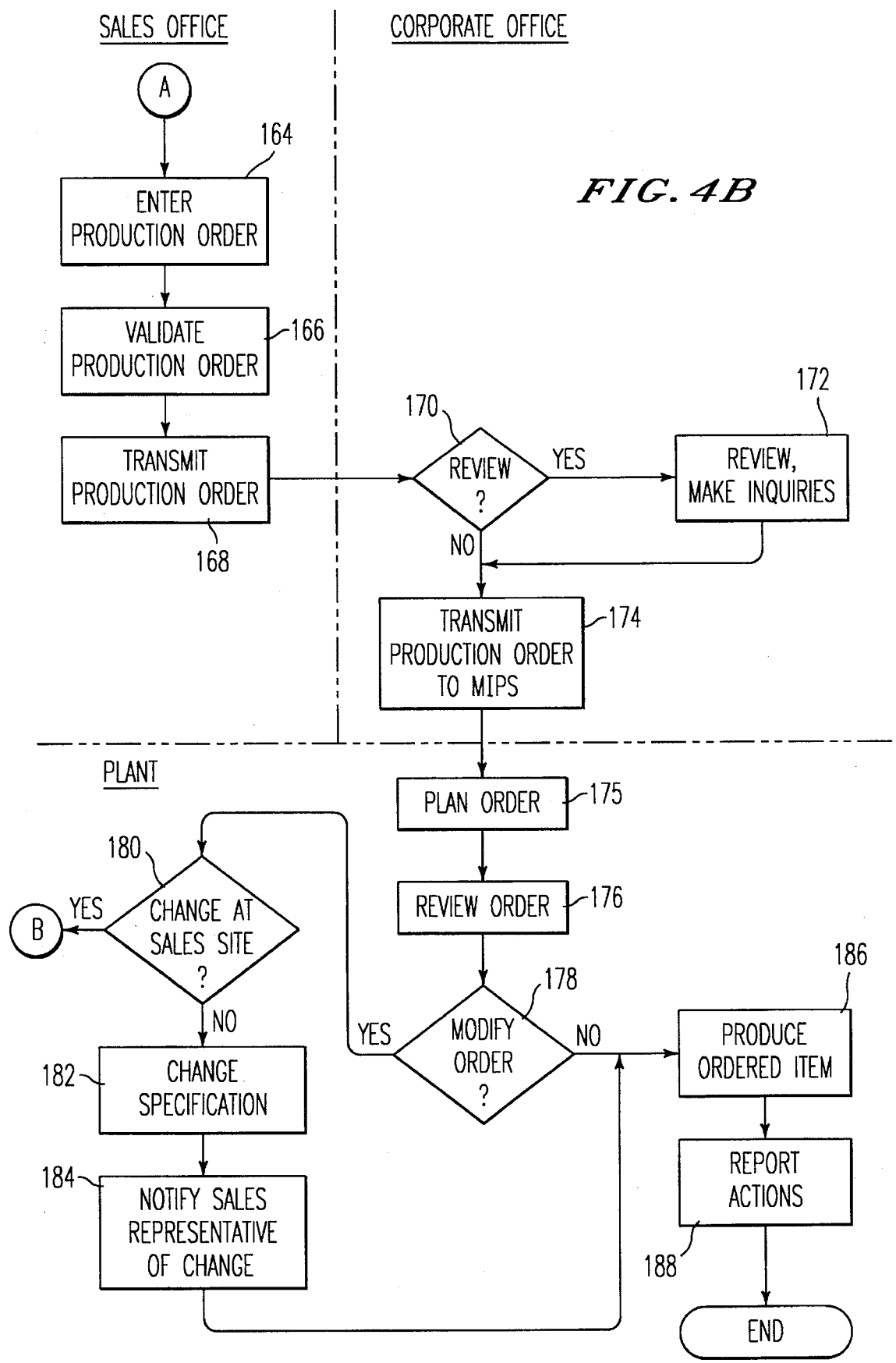
Figure 17:
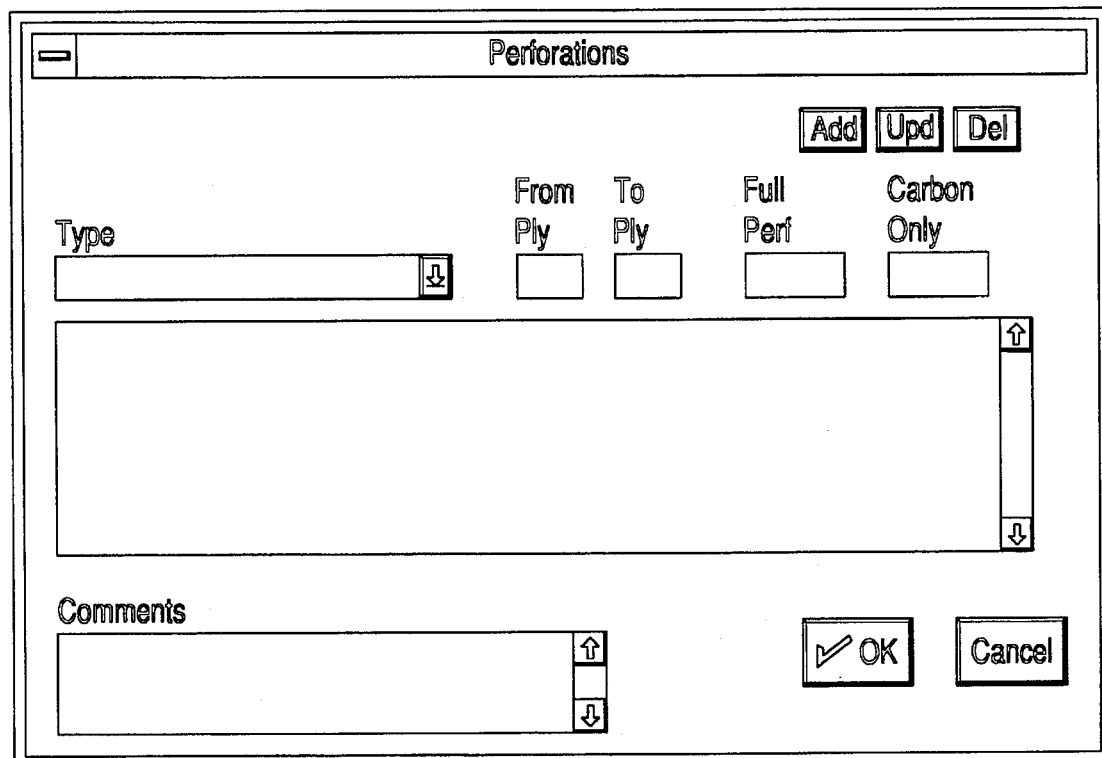
Figure 18:
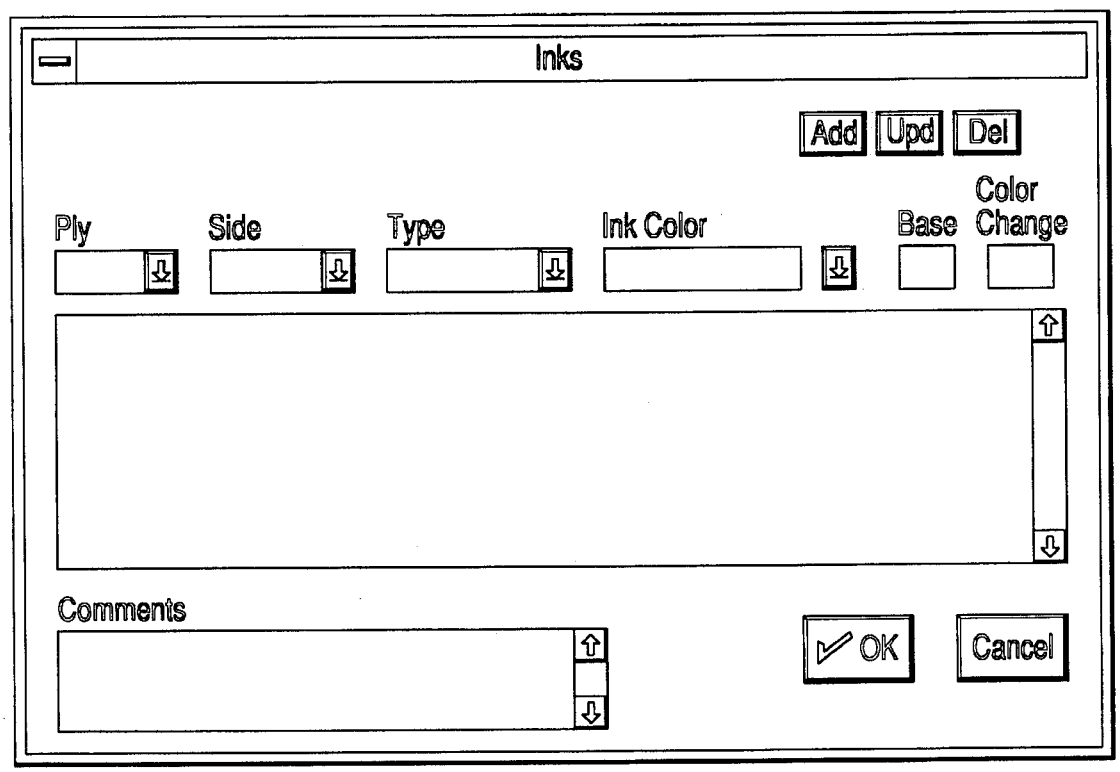
Figure 23:
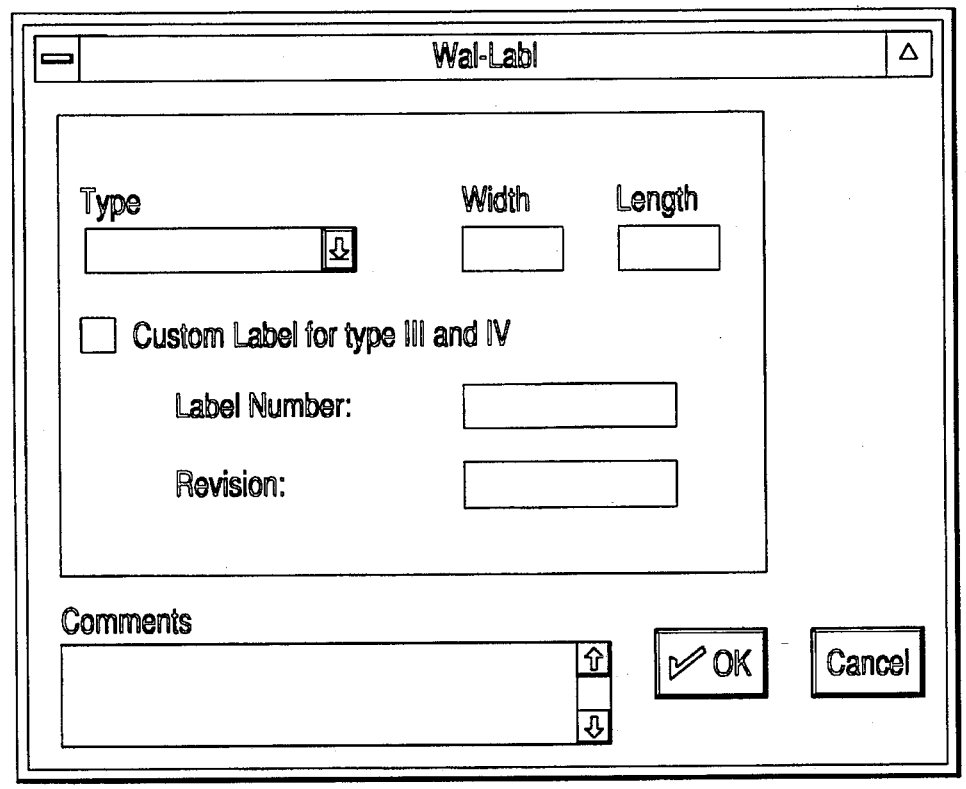
Figure 24:
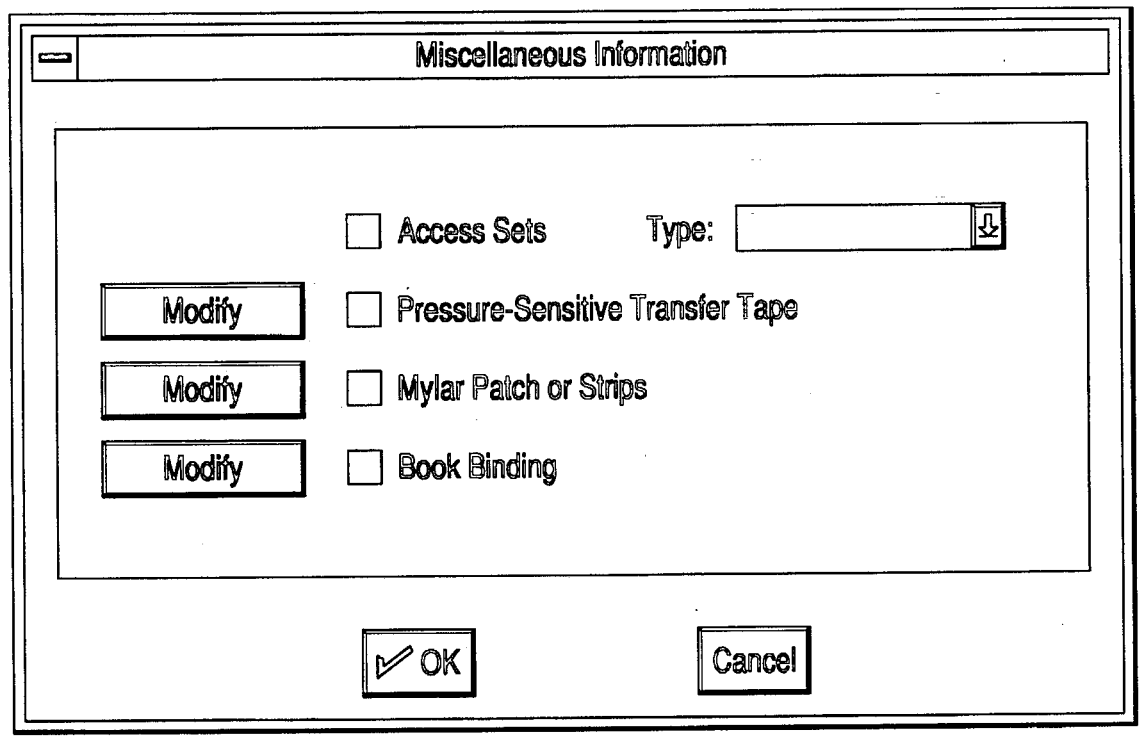
Figure 25:
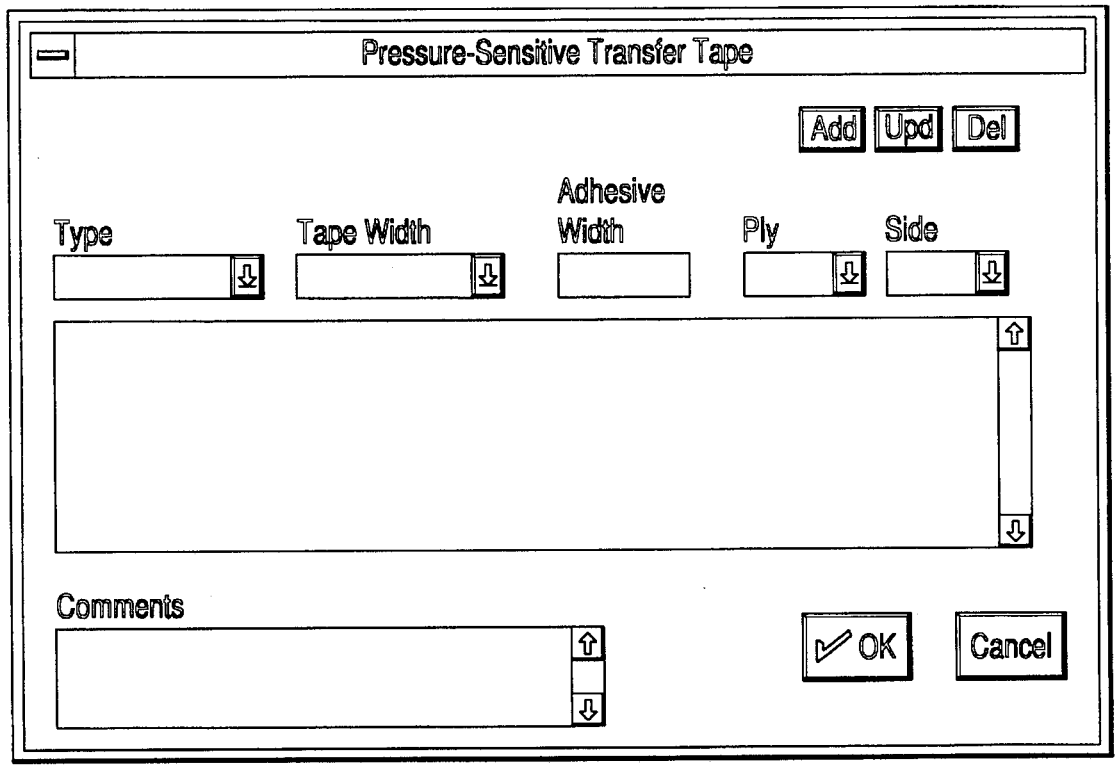
Figure 26:
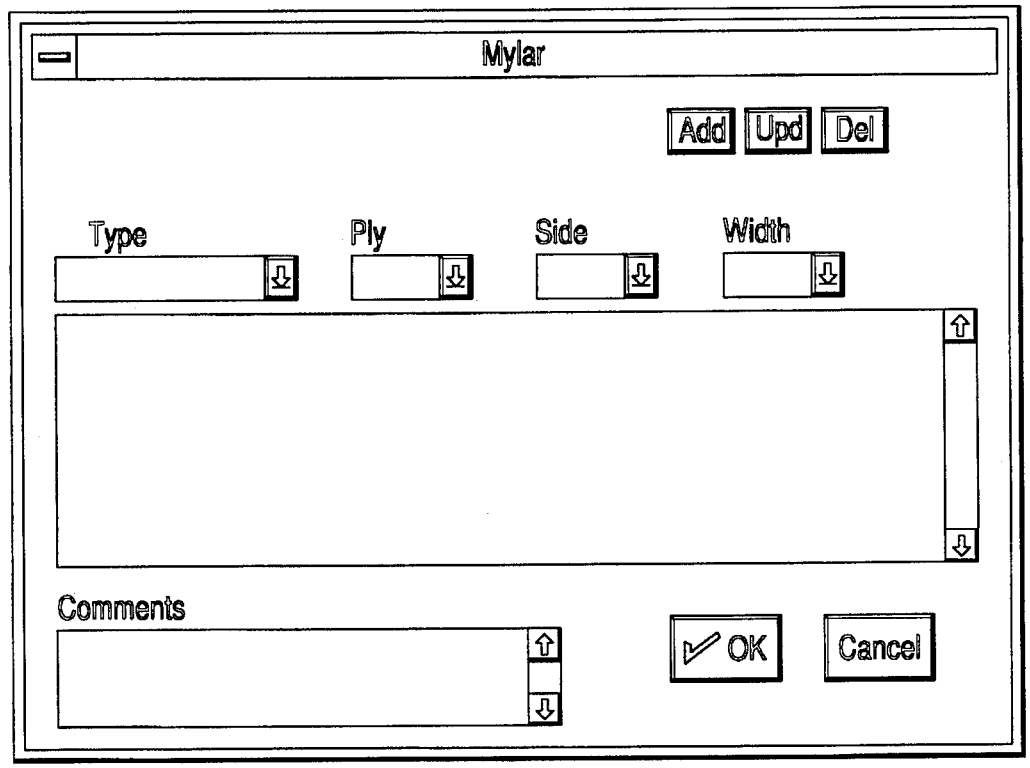

With continued reference to block 140 of FIG. 4 and the main menu screen (FIG. 5) of the SIN system, the sales representative can make appropriate selections from the menu at the bottom half of the main menu screen to specify: (1) the composition of the form (FIG. 11), such as detail changes in compositions between plies (FIG. 12), special composition elements (FIG. 13), and multicolor composition features (FIG. 14); (2) the fastenings used on the form (FIG. 15); (3) the type of punching, if any, required on the form (FIG. 16); (4) the type of perforations requested by the customer (FIG. 17); (5) information relating to the inks being used to produce the form (FIG. 18); (6) information relating to form pockets (FIG. 19); (7) the numbering on the form (FIG. 20); (8) packing and packaging information (FIG. 21); (9) optical scanning information (FIG. 22); (10) label features (FIG. 23); as well as (11) miscellaneous information (FIG. 24) regarding the application of pressure sensitive transfer tape (FIG. 25) and mylar patches (FIG. 26) to the form, and book binding (FIG. 27), among other form details that are seldom used relative to other form features. In addition to the above information associated with the estimate worksheets depicted in FIG. 5 through 27, an item specification can include the type of die used for printing, the quantity of forms, shipping dates and/or storage dates, ship-to locations, credit approval, contract number, shipping instructions, and special postage and handling requirements, among other types of customer order and planning information.

The screens are designed to highlight and/or restrict the user to only those menu options that are available based on previous inputs. Further, the estimate worksheet screens in FIGS. 5 through 27 are designed to accept more information than is necessary to obtain an estimate. Because the sales office computers are networked to each other and to the corporate office and plant computers, it is possible to copy most of the information that is needed for an estimate and item specification from data entered from a previous order for that customer, thereby eliminating the need to re-enter redundant information.

As shown in Block 141 of FIG. 4, the sales site computer preferably validates an item specification being transmitted for an estimate. The validation process prevents the sales representative from selecting features for a type of business form that cannot be priced or manufactured. For example, if the sales representative selects a product code indicating a mailer, the next screen generated by the PC prompts the sales representative to select features that are valid for mailers, and prevents user selection of features not permitted for this product type. The validation logic for item specifications is preferably controlled at the corporate office. As shown in Block 142 of FIG. 4, the sales representative transmits item specification information via the router 68 or the X.25 communication line to the RLA Gateway 40 when requesting estimate data from the corporate office.

With reference to Block 144, the corporate office computer system is programmed to validate the item specification. As described above, the corporate office maintains various types of data such as material costs, pricing factors, estimate data, contract data, and valid specification data, as well as specification costs and parameters. Material costs and specification costs are generally updated and maintained by the purchasing and industrial engineering departments of a manufacturing plant. For example, personnel in these departments are generally responsible for supplying data relating to material costs, material quotes, labor and burden costs to the SQL server 36. A Estimation or Industrial Engineering division is preferably used to maintain estimate parameters such as the pricing parameters and the valid specifications. For example, an estimating department and an operations and sales department can be used to obtain and enter into the SQL server 36 data such as price inflators and deflators, mark-ups, and contingency factors which may affect specification values and pricing parameters.

The validation process, block 144, involves cross-validating a selected item against the item specification to insure, for example, that a fastener was not ordered for a single ply type form. The selected item can be validated against the item specification to ensure that the appropriate materials were selected and the correct die information was entered. Validation of the specifications can comprise field-level edits and cross-validation.

With reference to the negative branch of decision block 145 and block 146, estimate generation incorporates data relating to a number of manufacturing processes of a job (e.g., imaging for producing color forms), waste matrices, effectivity dates for list price, set-up burden rates by a logical machine type within a division, material charges, among other data. The estimating data is maintained by the Estimating subsystem 90 (FIG. 2). In accordance with an embodiment of the invention, an estimate can be prepared using one or more matrices which can be generated, for example, using a spreadsheet-type software program (e.g., LOTUS or EXCEL or custom developed software), and which use the product type, different form features, and quantity indicated in the item specification, among other data, to generate cost and list pricing information. These matrices preferably reside in the Estimating subsystem 90. As will be described below in connection with block 158, the sales representative uses cost and list pricing information to determine a sell price for the manufacture of a custom form. Pricing information for stock items (e.g., telephone message pads or pads of lined paper that can be used by anyone) can also be generated using price matrices. The matrices preferably comprise standard cost information which can be generated using the Labor and Material subsystem 94 or the Estimating subsystem 90.

The Estimating subsystem 90 can be used to do some calculations using the matrices, or the matrix information can be transmitted to the sales site where calculations are executed. In either case, important pricing information is first obtained from the Estimating subsystem 90 before a sell price is determined therefrom and presented to a customer, in accordance with the present invention. This realizes a number of advantages for the present invention. The integrity of the pricing information is ensured when it is updated in a central location; otherwise, pricing information distributed among several sales sites may not be updated consistently. Sales sites would therefore be determining price from different matrices. Further, proprietary pricing data and algorithms are best kept at a central storage location for security reasons rather than being distributed to sales sites. Also, corporate office personnel realize a number of competitive advantages by maintaining a central repository of pricing and estimate data at the corporate office. Statistical analysis can be performed on the data to gain greater market visibility. For example, information such as the number of estimates that evolve into production orders can be used to ascertain which customers have not been approached by a sales representative or bring a large volume of business. The data can reflect a need to reward or further train sales representatives, or to offer a customer a pricing discount.

With reference to the affirmative branch of decision block 145 and block 147, the Estimating subsystem 90 can generate an estimate for an item that is to be priced in accordance with a contractual agreement between the customer and the corporation. As will be described below in connection with FIGS. 28 through 36, contract price matrices can be generated to reflect contractual terms. Contract price matrices can be created as a subset of the standard or generic price matrices used to generate estimates for non-contract items. The generic price matrices can be used for estimating any customers' orders. The generic price matrices are generally based upon raw material prices, equipment and other factors that affect actual cost to fulfill an order. A custom price matrix, on the other hand, can include contractual concessions between the forms manufacturer and the customer resulting in prices below, for example, the standard prices, i.e., discounts for the volume of business the customer brings to the manufacturer. An advantage of using contract price matrices is that they support contract proposal generation by corporate personnel in, for example, a Contract Administration division of the corporation by developing matrices of multiple items. This is particularly useful when the corporation is offering concessions to a customer with a large number of existing forms. The contract matrices eliminate the need to perform an estimate for each form for contract proposal purposes. Since contract terms are stored at the corporate office, corporate personnel can perform contract profit and other types of analysis, and provide contract customers with a common reference for pricing.

With reference to decision block 148, the present invention provides for the review and maintenance of estimates based on user-defined parameters, for the generation of list price promptly after a request for an estimate is made (provided the estimate does not require review), for the generation of a new list price and a repeat list price for estimates of new items, and for messaging back to the sales representative to inform him to which division an estimate is being routed should the estimate require review by corporate personnel.

With reference to the affirmative branch of decision block 148 and block 150, review of an estimate, for example, by an estimating department or operations and sales management department is advantageous for a number of reasons. Sales and operations management personnel can review estimates using various parameters when the estimates require use of a special material, a particularly large volume of material, or require complex construction or a new or special specification. Estimates which involve a particularly high dollar value or a particular customer can also necessitate review by corporate office personnel. This gives corporate office personnel an opportunity to use pricing information for processes that is external to the Estimating subsystem 90. For example, while a mailer product with six plies can be priced by the Estimating subsystem 90, the item can present difficulties to the plants. Batch validation of an item specification and estimate for the mailer allows corporate office personnel to review the estimate and make changes as needed. Batch validation also allows estimates for strategic customers or which exceed a predetermined dollar amount to be identified for review.

Following estimate review, the corporate office personnel responsible for reviewing estimates can enter and maintain notes on estimate and production orders and maintain item specifications. These corporate office personnel have the advantage of being able to maintain contingency and mark-up factors on an individual estimate basis, as well as being able to devise flexible exception criteria for estimate review notification. In addition, corporate office personnel can enter recommended and/or minimum sell prices.

With continued reference to block 150, review of an estimate is an iterative process. If the corporate office determines that an estimate is unacceptable, item specifications can be changed, as indicated by the affirmative branch of decision block 151 and block 152. For example, a less expensive grade of paper can be used or a larger quantity of forms can be ordered. An audit trail can be created for revised estimates to document changes.

With reference to block 153 of FIG. 4, an estimate that does not require review, or a validated estimate, is transmitted back to the sales representative at the sales site via the network and the router 52 or RLA Gateway 40, connecting the sales office to the corporate office. With reference to block 154, the estimate recaptured at the sales site preferably comprises cost and list price, recommended or minimum sell price where appropriate, order quantity, item specifications, and freight and storage information. The list price is preferably broken down to separate elements such as specifications and materials. The sales representative has access to alternate information such as price and quantity breaks, alternate materials, alternate specifications and minimum material requirements. The sales representative also has the ability to print out the estimate. With reference to the affirmative branch of decision block 156, the sales representative has the option of revising the estimate or simply obtaining multiple versions using different materials, quantities, and so on. A parameter filter is provided for changed or revised estimates for a parameter-controlled filtering of changed or revised specifications.

With reference to blocks 158, 160 and 162, the sales representative determines sell price from the estimate data and reviews the proposal with the customer. As indicated by the negative branch of decision block 162 and block 164, the customer can request a production order from an estimate which is found to be acceptable. The sales representative can use the PC 62 to automatically extract information from the estimate and add detail to generate a production order. The conversion of an estimate into a production order minimizes the re-entering of previously captured information. The sales representative can also enter sell price (or reference contract pricing matrices, if appropriate), ship date, the production plant, the identification of any supporting documentation, as well as enter storage agreement information. The production plant can be automatically selected by the mainframe computer 18 or selected by corporate office or sales office personnel.

As shown in block 166, each computer at the sales office preferably operates in accordance with the SIN 86 to validate production order details, as well as cross-validate selected items with reference to the production order details. The personal computer is also programmed to determine whether or not a customer has a contract with the manufacturer, to ensure the customer has a favorable credit status and to check for a concession percentage. The SIN 86 also stores in memory a version of the estimate used to produce the production order as part of an audit trail. The sales site computers are further programmed to prevent expired estimates from being converted into production orders, to ensure that each production order is linked to a particular estimate unless the order is the result of an outside purchase, as well as to check for concession percentage level. The latter feature enables sales management to be notified when acceptable concession levels are disregarded.

The validated production order is preferably sent electronically to the corporate office, along with copy folder information comprising the image of the form or label via routers 68 and 52 or via the RLA Gateway 40, as shown in block 168. These items can also be sent via regular mail, or by facsimile or other digital data transmission technique.

The sales representative can use the Forms Management subsystem 124 to design a new form in addition to entering information for an item specification. This form can be electronically transmitted along with the item specification and a request for an estimate to the corporate office. While transmission of this data is preferably downloaded from a PC 62 or 64 onto a digital communication line, the data can also be printed on a laser printer connected to the network 60 and transmitted via regular mail or by facsimile.

With reference to the affirmative branch of decision block 170 and block 172, production orders can be reviewed by production management personnel who review plant and equipment utilization and have the option to override the plant entered by the sales representative, as well as enter an override reason. Thus, inquiries on production orders can be made on an exception basis.

With reference to block 174, a production order which does not require review, or which has been found acceptable upon review by production management personnel, is subsequently transmitted electronically to the plant. As shown in block 175, the MIPS at the selected plant in turn places the production order in a queue for planning purposes by the Planning Bill of Materials subsystem 102. The Planning Bill of Materials subsystem 102 audits the estimate, that is, checks item specifications. As shown in blocks 176 and 178, sometimes changes need to be made at the plant because, of for example, a labor shortage or mechanical problem. The plant can communicate these changes in the production order via, for example, the minicomputer 56, to the sales representative or customer at the sales site via the LAN in routers 54, 62 and 68 (FIG. 1), as indicated by the affirmative branches of the decision blocks 178 and 180. Changes to the production order generally require changes in the item specification. Thus, the revised item specification is validated and then transmitted to the corporate office for another estimate, as shown in blocks 140, 141 and 142. If the item specification changes are minor (e.g., are not likely to affect the previously generated estimate), the plant personnel can make the changes and notify the sales representative, as shown in blocks 182 and 184.

If the plant does not require changes in the production order, the order is manufactured, as shown in block 186. As indicated in block 188, the completion of the job is reported to the Labor and Material subsystem 94 and the Estimating subsystem 90 for actual cost analysis and reporting, as well as to the sales site to keep the sales representative apprised of the status of the order.

The selection screens in FIGS. 28 through 36 can be generated on a mainframe terminal, for example, to guide contract management personnel at the corporate office when entering information for the creation of contract price matrices and generating a hardcopy of a custom price matrix. A portion of an exemplary custom price matrix is depicted in Appendix B. The contract information entered using the screens is processed to extract a subset of the generic price matrices which are pertinent to a particular customer.

With reference to FIG. 28, a user is prompted to enter general information in the following, correspondingly named fields: ACTION, PRODUCT TYPE, STANDARD CONTRACT SCHEDULE, CUSTOMER NAME, and NEW/REPEAT. The screen shown in FIG. 28, as well as the subsequent screens used for contract set-up, provide the user with at least two menus. A first menu 252 is provided at the top of the screen for generally editing and making inquiries as to a particular contract or a particular contract price matrix. Another menu 254 is provided at the bottom of the screen which comprises such functions as saving or printing a particular contract price matrix. The menu 252 at the top of the screen is hierarchical in nature because it provides the same options to make inquiries about ("I"), change ("C") or delete ("D") a currently stored contract, contract price matrix, or a particular entry within the contract or matrix. Further, the user can add ("A") a new contract, contract price matrix or entry within the contract or contract matrix.

Regarding the menu 254 at the bottom of the screen, the user can, among other functions: (1) depress the function key F1 on the keyboard to, for example, obtain a table menu on the screen; (2) depress the function key F4 to advance to the next screen; and (3) depress function keys F7 and F8 to print or save a schedule, respectively. The functions assigned to each function key can vary depending on the screen.

With continued reference FIG. 28, most of the fields in the screen and the following screens are self-explanatory. The STANDARD CONTRACT SCHEDULE field is automatically filled with a unique identification number when using the ADD or "A" menu option. The contract schedule number, along with the customer's name and the product type, appear at the top of the exemplary matrix (Appendix B). The STANDARD CONTRACT SCHEDULE field refers to the standard price-based schedule used as the basis for selection for the contract price matrix being created. This field defaults to the current price schedule being used unless the user enters the number of another prior price-based schedule. The value in this field is the default value for the same field in subsequent screens. The PRICING FACTOR and the EFFICIENCY FACTOR fields are provided with values by the user which also serve as default values for subsequent screens. The PRODUCT TYPE field is provided with one or more values that is obtained from the corporate office. The SQL server 36, for example, maintains a look-up table of unique identification numbers for each product offered for sale to customers, including forms, labels and other items produced at the plants, and ready-made items offered for resale. This value is a default value in subsequent screens.

The screen depicted in FIG. 29 prompts the user to enter one or more desired widths for each product type that can be priced using the contract price matrix being created. The screen depicted in FIG. 30 prompts the user to enter general information for developing composition pricing such as ACTION, STUB LENGTH, and PLY NUMBER. The standard base composition charge is retrieved from one of the generic price matrices. The exception base composition charge is calculated by multiplying the PRICE and/or the EFFICIENCY FACTOR, if previously entered, by the standard base composition charge. The base composition charge, whether it is a standard or exceptional one, is shown at the top of the exemplary matrix in Appendix B. Prices for additional charges and rules, set-up and run charges, and other factors can be added to this base, pre-press price. The user also has the option of entering special composition rules to retrieve selected prices from a database of general price-based rules maintained at the corporate office. As shown in the exemplary matrix, these rules can include, for example, pricing variances due to changes in the composition, heading changes, and printing on the back of a form.

FIG. 31 depicts a RULES SELECTION screen generated by the mainframe computer to prompt a user to invoke or delete a rule. The rules aid in the process of selecting data from the general price matrices that best suits a particular customer and contract terms. The rules can be stored in a look-up table in the database at the corporate office in accordance with their numbers and corresponding reference names. Rules are entered on the screen in FIG. 31 by their number and reference name, or another name assigned by the user. The screen thereafter serves as a reference or list of rules indicating the rules employed for that particular custom price matrix. An initial rule selection using the RULES screen allows the user to operate at the rule level, that is, the user is provided with a complete list of rules from which the user can select a list of potentially applicable rules by typing a "H" or a "D", respectively, in the left margin of the rule entry line. The second selection process using the RULES screen is at the sub-rule level of the rules selected initially. In other words, rules selected from the list of potentially applicable rules are transferred to the rule entry screen through which the RULES screen was invoked, i.e., the COMPOSITION PRICING, SET-UP PRICING and ADDITIONAL CHARGES screens. The RULES screen need not be invoked if the user already knows the subrule numbers needed to prepare the contract pricing matrix.

Figure 11:
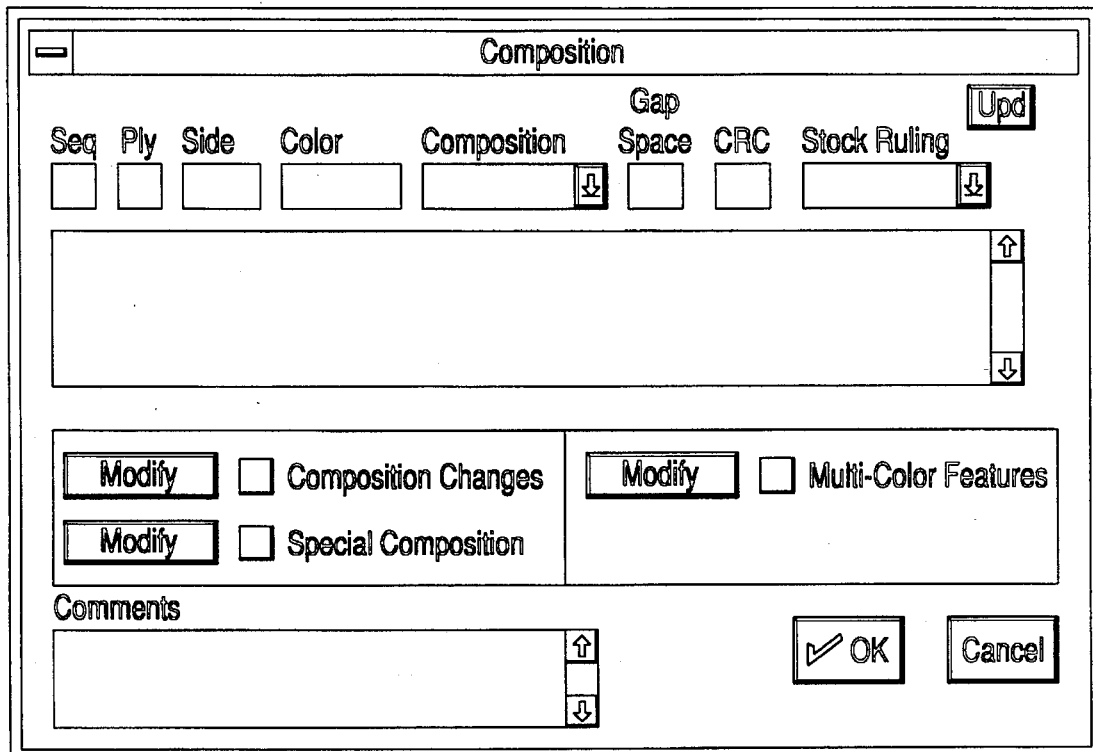
Figure 12:
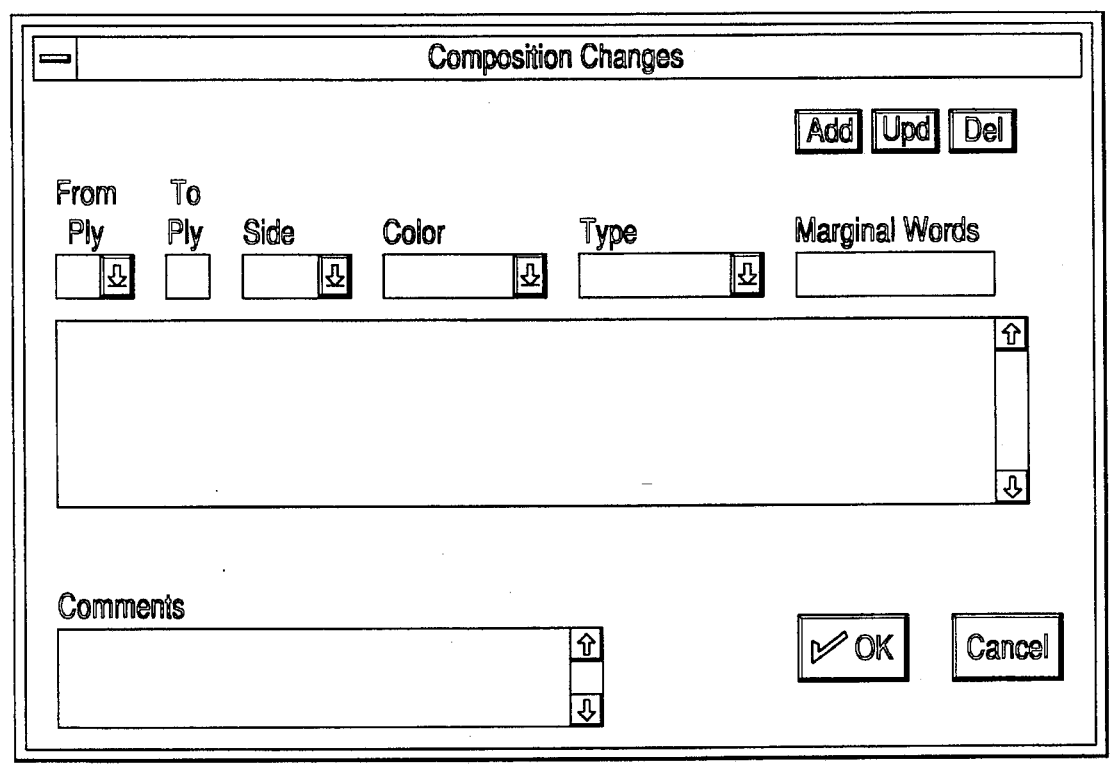

With reference the screen depicted in FIG. 32, the set-up pricing screen is similar to the composition pricing screen in FIG. 11. Set-up prices cover the cost of preparing plant equipment to complete a particular job. For example, special equipment or equipment configurations may be required to create a form that has perforations and requires printing on both sides thereof. The standard base set-up charge is retrieved from a generic priced-based matrix. The exception base set-up charge is calculated based on the standard base set-up charge and the PRICING and/or EFFICIENCY factors. Set-up rules can also be used to retrieve prices from the general price base rules database using the RULES SELECTION screen depicted in FIG. 31. As shown in the exemplary matrix, these rules can include additional colors, back printing, copy and color ink or paper changes, perforations, and hole punching and collating charges.

A RUN CHARGES screen (FIG. 33) is generated for the user to enter general information for developing run charges. Run or running charges comprise charges for running or processing paper through a press for printing, hole punching, or folding, for example, collating the various plies of multiple ply forms together, packaging, and otherwise preparing the forms for shipment. Running charges can also include charges for materials such as paper, carbon, ink, and cartons. Running charges are generally expressed in terms of multiples of forms, i.e., "per 1,000" or "per M". The values in the CONTRACT SCHEDULE, STUB LENGTH, PRODUCT TYPE, PLY NUMBER, PRICE FACTOR, EFFICIENCY FACTOR AND WIDTH fields are carried over from previous screens. Standard run charges are retrieved from the general price matrices and can be multiplied by PRICE and/or the EFFICIENCY factors to calculate exception run charges.

The ADDITIONAL CHARGES screen depicted in FIG. 34 prompt a user to enter general information for developing additional charges to be reflected in a contract price matrix. Standard flat charges and run charges are retrieved from the generic price rules database and are used with the PRICE and/or EFFICIENCY factors to calculate exception flat and run charges. Rules can also be used to retrieve prices from the general price base rules database using the RULES SELECTION screen depicted in FIG. 31. As shown in the exemplary matrix, these rules can modify prices in order to charge for ink matching, shrink wrapping and trimming.

With reference to FIG. 35, the VOLUME DISCOUNTS screen prompts a user to enter general information for establishing volume discounts in the contract price matrix under development. The user can create discounts based in dollar value and quantities of items ordered. The exemplary matrix shows pricing discounts based on the quantities ordered.

As indicated FIG. 36, the MATERIAL UPCHARGES screen prompts a user to enter general information for establishing material upcharges in the contract price matrix under development in fields such as the ACTION, WEIGHT, COLOR, GRADE and IMAGE fields. The remaining fields contain values carried over from previous screens. The standard upcharges are retrieved from a general price-based matrix and used with the PRICE and/or the EFFICIENCY factors to calculate exception upcharges.

After user makes entries in each of the above screens, the the standard contract schedule specified in the first screen, which is maintained by the Estimating subsystem 90, has information selected therefrom in accordance with the parameters defined by the fields in each of the above screens. The selected data for a contract matrix is subsequently stored in the database as a contract schedule or matrix, which is similar to the standard price matrices, and maintained by the Estimating subsystem 90. The contract pricing matrix can be condensed and printed on both sides of a form preferably using a laser printer connected to the corporate office PC network or LAN.

In accordance with another embodiment of the present invention, a number of estimating offices (not shown) can be connected to the corporate office network 24 using a router in much the same way as the sales offices and plants. The estimating offices can use an on-line system via the LAN 24 to receive estimates from sales offices and to review and revise them. The estimating offices provide for more timely responses to requests for estimates from sales offices than the corporate office because they are dedicated to this purpose. The estimating offices store in computer memory the following types of information: estimating logic information, estimate specifications and valid specifications. The estimating offices can perform a "help desk" role in that they can focus on larger and more unusual estimates than the corporate offices handle. In general, estimating offices maintain estimates and specifications, valid estimate specifications, transmit specifications to the corporate office and to the sales offices, receive price information from the corporate office database, review and maintain an estimate filter and perform messaging.

While certain advantageous embodiments have been chosen to illustrate the invention, it will be understood by those skilled in the art that various changes and modifications can be made herein without departing from the scope of the invention as defined in the appended claims.

What is claimed is:

1. A system for ordering the manufacture of an item comprising:

a first computer comprising a monitor, a first memory device and an input device for use by an operator initiating an order to enter customer order data selected from the group consisting of customer biographical data, credit approval data, item identification data, quantity data, shipping data, handling data, storage data, item usage data, ordering data, planning data, and contract data, and specification data relating to the item to be manufactured, and to store said customer order data and said specification data in said first memory device;

a second computer comprising a second memory device for storing a database comprising data relating to features of different types of items, to different manufacturing processes, and to material and labor costs for producing the different types of items, said database being operable to store data relating to a contract for the manufacture of items, said second computer being programmable to also use said contract data to generate said estimate data, said second computer being programmable to receive from said first computer said specification data, to generate estimate data for manufacturing said item using said specification data and said database, and to transmit said estimate data to said first computer, said first computer being further programmable to generate a production order by retrieving said customer order data and said specification data using said first memory and automatically combining said retrieved data with said estimate data;

a third computer located at a manufacturing plant; and a communication network, said first computer, said second computer and said third computer each being connected to said communication network, said third computer being operable to receive said production order via said communication network, said third computer being programmable to provide to said second computer at least one of a group of data types consisting of materials, labor and equipment available in the plant and used to fulfill said production order.

2. A method of ordering the manufacture of an item, comprising the steps of:

selecting the item to be manufactured from a plurality of items characterized by respective sets of parameters stored in a memory device using a first computer, at least one of said sets of parameters being different from the other said sets of parameters;

generating a specification for the item using said first computer by entering data relating to said set of parameters corresponding to the item to be manufactured using a first input device;

transmitting the specification to a second computer which is configured to maintain a substantially centralized database comprising pricing data;

generating estimate data using said second computer in accordance with said specification;

transmitting said estimate data to said first computer;

generating a first production order using said first computer in accordance with said specification and said estimate data;

transmitting said first production order to said second computer;

transmitting said first production order to a third computer at a manufacturing plant, said second computer being located at a corporate office and said first computer being located at a sales site remotely located from the corporate office; and reviewing said first production order at said corporate office.

3. A method of ordering the manufacture of an item, comprising the steps of:

selecting the item to be manufactured from a plurality of items characterized by respective sets of parameters stored in a memory device using a first computer, at least one of said sets of parameters being different from the other said sets of parameters;

generating a specification for the item using said first computer by entering data relating to said set of parameters corresponding to the item to be manufactured using a first input device;

transmitting the specification to a second computer which is configured to maintain a substantially centralized database comprising pricing data;

generating estimate data using said second computer in accordance with said specification;

transmitting said estimate data to said first computer;

generating a first production order using said first computer in accordance with said specification and said estimate data;

transmitting said first production order to said second computer;

transmitting said first production order to a third computer at a manufacturing plant, said second computer being located at a corporate office and said first computer being located at a sales site remotely located from the corporate office; and reviewing said first production order at said manufacturing plant and fulfilling said first production order if it is determined to be acceptable, and notifying said first computer if said first production order is determined to be unacceptable.

4. A method of ordering the manufacture of an item, comprising the steps of:

selecting the item to be manufactured from a plurality of items characterized by respective sets of parameters stored in a memory device using a first computer, at least one of said sets of parameters being different from the other said sets of parameters;

generating a specification for the item using said first computer by entering data relating to said set of parameters corresponding to the item to be manufactured using a first input device;

transmitting the specification to a second computer which is configured to maintain a substantially centralized database comprising pricing data;

generating estimate data using said second computer in accordance with said specification, said generating step comprising the step of determining pricing data from at least one table of data stored in a memory device that is accessible by said second computer, said pricing data comprising data that is specific to a particular customer with whom a contractual agreement is established and for which said table is modified in accordance with the terms of the contractual agreement; and transmitting said estimate data to said first computer.

5. A method of ordering the manufacture of an item as claimed in claim 4, wherein said table is modified in accordance with at least one of a plurality of data types comprising of a price factor, an efficiency factor, a pricing rule, a volume discount, a characteristic of the item to be manufactured in accordance with the contractual agreement, an equipment set-up charge, a run charge and a material upcharge.

* * * * *

UNITED STATES PATENT AND TRADEMARK OFFICE
CERTIFICATE OF CORRECTION

PATENT NO. : 5,570,291
DATED : October 29, 1996
INVENTOR(S) : James Dudle, et al It is certified that error appears in the above-indentified patent and that said Letters Patent is hereby corrected as shown below:

On title page, item [75], third inventor should read as follows:
--Michael Morison--

Appendices A and B, should be inserted to read as shown on the attached pages.

Signed and Sealed this

Third Day of June, 1997

*Attest:*

BRUCE LEHMAN

*Attesting Officer*    Commissioner of Patents and Trademarks

APPENDIX A

FORM SPECIFICATION

FORM: WCSFMSSFRP REV 2.0 Apr/93 PAGE 1 of 3

GENERAL INFORMATION

| | | |
|---|---|---|
| CUSTOMER ITEM NUMBER 01-2609C | ITEM DESCRIPTION 01-2609C SHIPPING ORDER JOHNSTOWN, PA | |
| PRODUCT TYPE Unit Set | | |
| ITEM NUMBER | DESCRIPTION | |
| DATE ADDED 02/23/93 | DATE LAST UPDATE 07/06/93 | CONTRACT NUMBER | PRODUCT CODE |
| CUSTOMER CONTACT TAMMY THOMAS | PRIMARY VENDOR | |
| CUSTOMER CONTACT PHONE # | SECONDARY VENDOR | |
| ORIGINATING DIVISION | GROUP 1 KEYWORD | REVISION NUMBER 1 |
| ORIGINATING DEPARTMENT INDUSTRIAL LUBRICANT | GROUP 2 KEYWORD | REVISION DATE 06/10/92 |
| FOB POINT Plant | GROUP 3 KEYWORD | JOB TYPE JL |
| LOGO ID | ELECTRONIC FORM ID | |
| FOLLOW UP DATE | FOLLOW UP REASON | |
| DATE CANCELLED | DISPOSITION OF STOCK | REPLACEMENT ITEM NUMBER |

USAGE INFORMATION

| MINIMUM ORDER POINT | ORDER IN MULTIPLES OF | MINIMUM PRINT QUANTITY | NUMBER OF LOCATIONS | ESTIMATED ANNUAL USAGE | QTY UOM | QTY UOM FACTOR |
|---|---|---|---|---|---|---|
| | | 11000 | | | Thousand | 1,000 |

| STORAGE TERMS | | | LEAD TIME (IN DAYS) | | CHARGEBACK | |
|---|---|---|---|---|---|---|
| # MONTHS/PRNT | # PRINTS | # SHIPS/PRINT | MANUFACTURING | RELEASE FROM STOCK | PRICE | PRICE UOM FACTOR | DEFAULT DEPARTMENT |
| | | | 2 | | 57.00 | 1,000 | |

| PACKAGING METHOD | FORMS PER PACKAGE | FORMS PER CARTON |
|---|---|---|

SPECIAL REMARKS NO SAMPLE

SPECIAL ORDERING INSTRUCTIONS

FEATURES

| ITEM # 01-2609C | FORM SPECIFICATION | FORM WCSFMSSFRP REV 2.0 April93 PAGE 2 of 3 |

PERFORATIONS  # PERFS 1   TYPE Vertical
LOCATION

NUMBERING  TYPE 3/16" Std Gothic - 2 Numbers
SERIAL NUMBERING   ENDING 65 64 63 62 61 60 59 58 57 56 55 54 53 52 51 50 49 48 47 46 45 44 43 42 41 40 39 38 37 36 35 34 33 32 31 30 29 28 27 26 25 24 23 22 21 20 19 18 17 16 15 14 13

APPENDIX A   Page 4 of 5

FORM SPECIFICATION

ITEM # 01-2609C

FORM WCSFMSSFRP REV 20 Apr/93 PAGE 3 of 3

CONSTRUCTION

PLYS: 2  
CARBONS:  
FORM SIZE STUB: 8.5000  
FORM SIZE WIDTH: 9.7500

| PLY | PAPER WIDTH | PAPER WEIGHT | PAPER COLOR | PAPER GRADE | MARGIN WORDS | CARBON WIDTH | CARBON GRADE | CARBON SPEC'S |
|---|---|---|---|---|---|---|---|---|
| 1 | 9.7500 | 26# | White | CB Grade 1 | | | | |
| 2 | 9.7500 | 27# | White | CF Grade 1 | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |

FASTENING

| No & TYPE | LOCATION | PARTS | | CARBONS | |
|---|---|---|---|---|---|
| Pre-Collated | Top | PARTS 1 | THRU 2 | CARBON | THRU |
| | | PARTS | THRU | CARBON | THRU |
| | | PARTS | THRU | CARBON | THRU |
| | | PARTS | THRU | CARBON | THRU |
| | | PARTS | THRU | CARBON | THRU |

INKS

| PLY | FRONT | | | | | BACK | | | | |
|---|---|---|---|---|---|---|---|---|---|---|
| | INK COLOR 1 | INK COLOR 2 | INK COLOR 3 | INK COLOR 4 | INK COLOR 5 | INK COLOR 1 | INK COLOR 2 | INK COLOR 3 | INK COLOR 4 | INK COLOR 5 |
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| 9 | | | | | | | | | | |
| 10 | | | | | | | | | | |

STANDARD: 1

APPENDIX B

CUSTOMER NAME: T.R.G.
PRODUCT TYPE: UNIT SET
CONTRACT SCHEDULE : 01001

P R E - P R E S S    STUB SIZE: 8 1/2

<------------------------------ WIDTHS ------------------------------

| * BASE COMP * | 6 1/8 | 7 5/8 | 11 5/8 | 14 5/8 |
|---|---|---|---|---|
|  | 240.00 | 240.00 | 265.00 | 240.00 |

* ADD'L RULES *

| | 6 1/8 | 7 5/8 | 11 5/8 | 14 5/8 |
|---|---|---|---|---|
| MAJOR CHANGE | 145.00 | 145.00 | 164.00 | 164.00 |
| MINOR CHANGE | 90.00 | 90.00 | 97.00 | 97.00 |
| HEADING CHG | 62.00 | 62.00 | 64.00 | 64.00 |
| BACK PRINTING | 105.00 | 105.00 | 112.00 | 112.00 |
| MULTIPLE CLR | 128.00 | 128.00 | 140.00 | 140.00 |

S E T - U P    STUB SIZE: 8 1/2

<------------------------------ WIDTHS ------------------------------

| * BASE SETUP | 6 1/8 | 7 5/8 | 11 5/8 | 14 5/8 |
|---|---|---|---|---|
| # OF PLIES |  |  |  |  |
| 02 | 137.00 | 137.00 | 137.00 | 137.00 |
| 03 | 168.00 | 168.00 | 168.00 | 168.00 |
| 04 | 198.00 | 198.00 | 198.00 | 198.00 |
| 05 | 228.00 | 228.00 | 228.00 | 228.00 |
| 06 | 259.00 | 259.00 | 259.00 | 259.00 |

* ADD'L RULES *

| | 6 1/8 | 7 5/8 | 11 5/8 | 14 5/8 |
|---|---|---|---|---|
| ADD'L COLORS | 52.00 | 52.00 | 52.00 | 52.00 |
| BACK PRINTING | 68.00 | 68.00 | 68.00 | 68.00 |
| COPY CHANGE | 38.00 | 38.00 | 38.00 | 38.00 |
| COLOR CHANGE | 56.00 | 56.00 | 56.00 | 56.00 |
| NUMBER SET-UP | 77.00 | 77.00 | 77.00 | 77.00 |
| VERTICAL PERF. | 14.00 | 14.00 | 14.00 | 14.00 |
| HORIZ PERF. | 55.00 | 55.00 | 55.00 | 55.00 |
| FILE HOLE PNCH | 23.00 | 23.00 | 23.00 | 23.00 |
| COLLATOR CHG | 60.00 | 60.00 | 60.00 | 60.00 |

R U N   C H A R G E S    STUB SIZE: 8 1/2

<------------------------------ WIDTHS ------------------------------

| * BASE RUN | 6 1/8 | 7 5/8 | 11 5/8 | 14 5/8 |
|---|---|---|---|---|
| # OF PLIES |  |  |  |  |
| 02 | 29.66 | 29.66 | 37.10 | 42.78 |
| 03 | 42.46 | 42.46 | 54.83 | 64.13 |
| 04 | 53.08 | 53.08 | 69.94 | 82.52 |
| 05 | 66.43 | 66.43 | 88.21 | 104.52 |
| 06 | 78.80 | 78.80 | 105.40 | 125.31 |

A D D ' L   C H G S.    STUB SIZE: 8 1/2

| * RULE DESC. * | QTY | FLAT | RUN/M |
|---|---|---|---|
| MATCH INK |  | 65.00 | .30 |
| POLYWRAP | 25 | N/C | 9.75 |
| POLYWRAP | 50 | N/C | 4.03 |
| POLYWRAP | 100 | N/C | 2.40 |
| POLYWRAP | 250 | N/C | .26 |
| TRIM (CUTTING) |  | N/C | 5.52 |

V O L U M E   D I S C.    STUB SIZE: 8 1/2

<------------------------------ WIDTHS ------------------------------

| | 6 1/8 | 7 5/8 | 11 5/8 | 14 5/8 |
|---|---|---|---|---|
| QTY TO |  |  |  |  |
| 15M | 20 % | 20 % | 12 % | 10 % |
| 50M | 28 % | 28 % | 20 % | 13 % |
| 100M | 33 % | 33 % | 25 % | 15 % |
| 100M UP | 37 % | 37 % | 27 % | 17 % |

M A T ' L   U P C H G    STUB SIZE: 8 1/2

<------------------------------ WIDTHS ------------------------------

| * BASE SETUP | 6 1/8 | 7 5/8 | 11 5/8 | 14 5/8 |
|---|---|---|---|---|
| PAPER |  |  |  |  |
| 15# CCL RB | 1.44 | 1.44 | 2.03 | 2.50 |
| 20# WHT RB | 1.95 | 1.95 | 2.64 | 3.15 |
| 20# COL RB | 3.57 | 3.57 | 5.10 | 6.24 |
| 15# WHT CB CCT | 6.11 | 6.11 | 8.55 | 10.36 |
| 15# COL CB CCT | 6.60 | 6.60 | 9.30 | 11.31 |
| 14# WHT CFB CCT | 8.10 | 8.10 | 11.56 | 14.16 |
| 14# COL CFB CCT | 8.27 | 8.27 | 11.04 | 14.50 |
| 15# WHT CF CCT | 4.71 | 4.71 | 6.60 | 8.00 |
| 15# COL CF CCT | 4.91 | 4.91 | 6.90 | 8.39 |
| 105# CF TAG CCT | 30.77 | 30.77 | 42.77 | 51.75 |
| 100# WHT/MLA TG | 17.87 | 17.87 | 24.43 | 29.33 |